United States Patent [19]

Christie et al.

[11] Patent Number: 5,757,669

[45] Date of Patent: May 26, 1998

[54] METHOD AND APPARATUS FOR WORKGROUP INFORMATION REPLICATION

[75] Inventors: David Christie, Menlo Park; Jeffrey Winner, Santa Clara, both of Calif.

[73] Assignee: Netscape Communications Corporation, Mountain View, Calif.

[21] Appl. No.: 456,431

[22] Filed: May 31, 1995

[51] Int. Cl.⁶ ............................................. G06F 13/00
[52] U.S. Cl. .......................... 364/514.006; 395/200.18; 395/600; 395/700
[58] Field of Search .................. 395/200.01, 200.02, 395/200.08, 200.18, 600, 650, 700, 182.9, 182.11; 364/514 C

[56] References Cited

U.S. PATENT DOCUMENTS

| | | | |
|---|---|---|---|
| 4,635,189 | 1/1987 | Kendall | 395/600 |
| 5,043,871 | 8/1991 | Nishigaki et al. | 395/600 |
| 5,404,508 | 4/1995 | Konrad et al. | 395/600 |
| 5,452,448 | 9/1995 | Sakuraba et al. | 395/600 |
| 5,530,855 | 6/1996 | Satoh et al. | 395/600 |
| 5,557,736 | 9/1996 | Hirosawa et al. | 395/182.02 |

*Primary Examiner*—Hassan Kizou
*Attorney, Agent, or Firm*—Hecker & Harriman

[57] ABSTRACT

The present invention provides the ability to use an existing store-and-forward messaging network such as an electronic mail system to replicate data between computer sites. The replication provided by the present invention can be used with software applications, such as workgroup applications, to replicate data located on multiple sites. Workgroup replication data is sent to other sites via electronic mail ("e-mail") messages. The present invention provides reliability features to handle errors in electronic mail transmissions. For example, the present invention provides the ability to reassemble objects at a replication site such that an object and all of its dependencies exist prior to the object's use at the site. Messages referred to as "ACK" messages are used to communicate a site's state and to provide other control information. Each site maintains latency information to determine transmission failures.

22 Claims, 12 Drawing Sheets

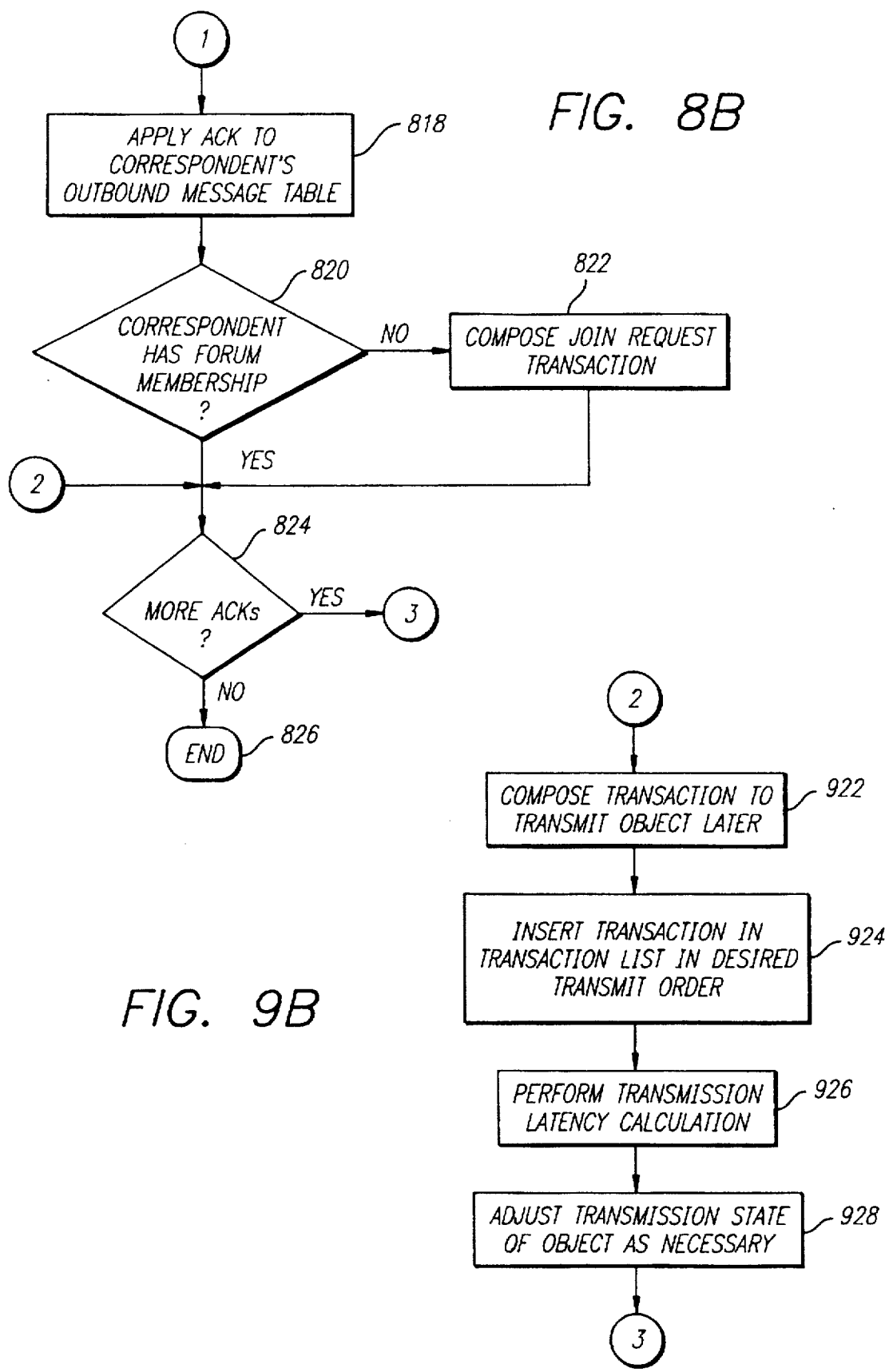

METHOD AND APPARATUS FOR WORKGROUP INFORMATION REPLICATION

BACKGROUND OF THE INVENTION

1. Field of the Invention

This invention relates to information sharing and replication via a store-and-forward messaging network.

2. Background Art

In a business environment, computer users need to be able to communicate regarding aspects of the business. For example, a group of users may need to discuss a strategic planning document that is being prepared by the group. One member of the group may prepare a draft and send it to the other members. After reviewing the draft, one or more of the recipients may generate a reply. The reply may be, for example, a message regarding the document's contents, or a new document that contains modifications to the original document. The reply may be sent to the some or all of the group's members.

The group interaction described above is facilitated using software that is referred to as workgroup software. A "workgroup" is a number of people who are associated on the basis of the product they produce or the service they provide. A "workgroup" can be further defined as a number of people who interact through common forums (i.e., a collection of shared documents) to enhance their ability to deliver products or services. Using workgroup software, users can access the documents in their collection, or group, of documents. Further, the members of a workgroup can electronically converse with one another on the subject of the document.

For example, a workgroup member may make a contribution to the discussion or conversation by sending a reply to a draft document. Another member can view the reply and send a reply to the reply.

A workgroup can be, for example, a team, department, or an entire enterprise. A workgroup can be comprised of users that are located on the same LAN. A workgroup located on the same LAN can share a single copy of the database located on a network file server. However, a workgroup may not be centrally located. Some members of a workgroup may be remotely located (e.g. another city or state) or on another network, for example. Some method of communication between LANs must be provided to extend a workgroup to a remote site. Each site must maintain a copy of the database that is referred to as a replica. The sites must be able to communicate to synchronize information between the sites. To synchronize information among the sites, information must be replicated from one site to another.

For example, a document created or modified at one site must be replicated to the other site(s). Further, any changes or deletions must also be replicated to the other sites. Using replication, each replica (i.e., copy of the database) can be synchronized with the replicas at other site(s).

Replication between sites, therefore, requires inter-site communication to synchronize information among the sites. One type of inter-site communication that has been used requires that the sites be directly connected via modems and telephone lines or via a network connection. Each site's database must be in active, direct communication with each sites' databases during replication. A "calling" schedule must be established between the replication sites.

Therefore, to replicate objects, or documents, from one site to another using this technique, a site must establish active and direct communication with the other site. One site must call the other site to initiate a direct connection. When a connection is established between two sites via the telephone or via a LAN, one site must log into the other site's Database Management System (DBMS). Once a direct connection is established between the two sites' databases, an interactive comparison of the information at the two sites is performed to determine what objects need to be transmitted between the sites. During the direct connect session, the objects are shipped from one site to the other site. Once the replication process is completed, the connection between the two sites is terminated. This process is repeated for each combination of sites according to the "calling" schedule.

This type of replication scheme requires that a "calling" schedule be developed between the sites. Where, for example, there are three sites (i.e., site A, B, and C), a "calling" schedule must be developed to coordinate the direct connections linking all three sites. Each site must be in active communication with at least one other site, and indirectly with all other sites, to perform synchronization using this direct connection replication scheme.

Thus, using this replication scheme, a site's database must be in active communication with another site's database during replication. Further, it requires additional work to coordinate and administer the "calling" schedule between the replication sites. Therefore, it would be beneficial to have a replication scheme that does not require direct interaction between site databases thereby eliminating the need for "calling" schedules. Further, it would be beneficial to have a replication scheme that uses a communication infrastructure that already exists between the sites.

SUMMARY OF THE INVENTION

The present invention provides the ability to use an existing store-and-forward messaging network such as an electronic mail system to replicate data between computer sites. The replication provided by the present invention can be used with software applications, such as workgroup applications, to replicate data located on multiple sites. Workgroup replication data is sent to other sites via a messaging system such as an electronic mail ("e-mail") system. The present invention provides reliability features to handle errors in electronic mail transmissions. For example, the present invention provides the ability to reassemble objects at a replication site such that an object and all of its dependencies exist prior to the object's use at the site. Messages referred to as "ACK" messages are used to communicate a site's state and to provide other control information. Each site maintains latency information to determine transmission failures.

The invention enables remote users to participate in forums across network and geographic boundaries by copying workgroup information at multiple sites via an electronic store-and-forward messaging network. Using a store-and-forward messaging network, there is no need for immediate transmission of a message to a remote site. Thus, the replication provided by the present invention can be done without real-time connections between replication sites. Site databases do not need to be directly connected to perform replication. Site databases may be indirectly connected, for example, via e-mail. Since there is no need for direct connection between databases, there is no need to develop a "calling schedule" between site databases. Further, there is no need to provide dedicated communications hardware, telephone lines, or other infrastructure beyond that which is currently being used for e-mail.

Using the present invention, a forum (i.e., a collection of documents) can be replicated to a remote site for access by remote users authorized to access the forum (e.g., forum members) without requiring that the two sites be directly and actively connected to the other site's databases. A contribution to the forum (e.g., reply to a forum document) by a remote user is replicated to other forum sites by creating an e-mail message. The e-mail message is addressed to the other forum sites. Once received at another site, the forum contribution is threaded into the discussion at that site.

Each site executes a replication agent, or replicator. A replication agent copies and synchronizes databases, computer data, or collections of computer files on different computers. These computers can be at remote, widely dispersed physical sites. A replication agent resides at each site. Each replication agent synchronizes the data at its site with the data stored at the other site(s) so that identical copies of the data can be maintained at all of the sites. At each site, there is a central file server or shared hard disk that is also used to store workgroup application files (e.g., the local copy of each replicated database, or replica). The replication agent is a batch or session-oriented software program that executes at each site and has access to the local replica. A program known as an agent manager initiates a replication agent session based on a schedule defined by a system administrator.

Each site has a forum database, an electronic mailbox, and a side replicator database. A forum database contains information about each document in the forum. The electronic mailbox is used by a forum site to send and receive e-mail messages. The side replicator database maintains information about the objects known to the local site and the states of the local and each remote site, or correspondent. A forum further has at least one forum member that is designated as a forum moderator. The forum moderator enforces the enrollment policy for the forum. The forum moderator has the ability to grant or deny membership to those requesting membership to the forum.

The replication agent for each site determines the state of the site. The replication agent corresponds with other sites by sending e-mail messages to the other sites. The replication agent sends a message to other sites that indicates the state of its site. The replication agent uses the information received from another site to determine the objects that should be replicated between the sites. For example, the replication agent uses another site's information to determine which objects need to be sent to that site and which objects should be replicated to its own site.

When an object is created, it is assigned an original unique identifier (UID). The original UID includes an identifier that identifies the creation site or creating entity. In addition, the original UID contains a portion that uniquely identifies the object. The UID further contains information that is derived from the object's actual content (a checksum). The purpose of all the information comprising the UID is to ensure that each object has a UID that is unique among all objects that have ever existed anywhere in the world (i.e., a unique "fingerprint"). An object's UID is never reused by, for example, reassigning it to another object after the original object has been deleted. Changes to, or deletions of, existing objects are treated as new objects for the purpose of replication. That is, each new version of an object is considered to be a unique object and is given its own UID. The act of deleting an object constitutes its final version (whose contents are empty). In this way, events including changes, deletions and creations can be replicated using the same mechanism.

Each object carries the UIDs of certain other objects in addition to its own UID. These other UIDs identify other objects to which it is related. For example, every object that has been changed or deleted carries the UID of its original version (the UID of the object from which it evolved) in addition to its own UID. Therefore, all version of the same object can be identified by virtue of carrying the same original version (in addition to their own, unique UIDs). In addition, information such as version numbers and dates can be maintained so that it is possible to sequence versions (e.g., from the oldest to the most recent version).

A replication agent (transmitting agent) sends a list of UIDs to another agent (receiving agent) via a message known as an "ACK" message. The receiving agent compares the list of UIDs with its own list of UIDs to determine which objects should be sent to the sending site. The objects that are identified by the receiving agent are those objects that the receiving agent determines are unknown to the transmitting agent (i.e., the agent that sent the ACK message) or for which the receiving agent has a more recent version than the one identified in the transmitting agent's ACK message. The receiving agent can perform this process for each of the sites from which it has received state information.

The replication agent identifies the objects that are to be sent to all of the remote sites. Further, the replication agent determines which sites are to receive which objects. Once the objects and the sites to which the objects should be sent have been identified, the replication agent prepares e-mail messages that contain the objects. If the object is the final version of an object (i.e., its deletion) the e-mail message contains instructions for deleting the object.

Before a replication agent can determine which objects need to be sent to remote sites, the replication agent must determine the current state of the objects stored at the local site. To determine the current state of stored objects, the replication agent examines all of the local object stores. These object stores include the site's mailbox (or mailboxes, where multiple e-mail systems are used) and its database (or databases where multiple copies of the same database are maintained locally by one replicator). The replication agent searches the object stores and updates the site's side replicator database.

The site's mailbox contains objects sent by other replication agents from other sites. An object received from another site is removed from the mailbox and is eventually stored in the corresponding forum database at the receiving site along with its UID. It replaces any earlier version of the object already present in the database. If it is the final version of the object, it causes the object to be deleted from the database.

Once the site's mailbox has been searched, the replication agent begins to search the forum's database(s) for objects that have been created, modified or deleted since the last replicator session. A creation, modification, or deletion of an object is referred to as an event. The DBMS provides an associated flag that indicates whether each existing object has had an associated event since the last session. The replication agent examines each existing object's flag to determine whether the object is new or has been modified.

If an event has occurred for the object, the replication agent assigns a new UID to represent the new object version that resulted from this event. It writes the new UID back into the object in the database to make the association permanent. Finally, it adds the new UID to the side replicator database. If, for some reason, the replication agent was unsuccessful in writing the new UID into the object itself, the UID is discarded and forgotten. In a subsequent session, the replication agent can examine the flag, and make another attempt to assign a new UID and record it in the object and the side replicator database. Since the UID is not recorded in the side replicator database or used for replication prior to its permanent ascription in the object in the database, the side replicator database can be reconstructed from the forum database. Further, no single version of an object will be given more than one UID. The process of assigning a UID to an object is referred to as stamping. Once an object is stamped, the UID of that version of the object can never change. Any change to the content of an object is considered a new version as well as a new object that is stamped with a new UID.

The replication agent examines all of the site's object stores and updates the site's Event Table, a component of the side replicator database. Once all of the site's object stores have been examined, the replication agent has an updated Event Table that represents the site's current state. The replication agent can send the relevant portion of its Event Table to another site for comparison with the other site's current state.

To determine a site's state relative to the state of the other site(s), the replication agent compares its Event Table with the Event Table information received from the other site(s) in ACK messages. Based on this comparison, the replication agent can identify which objects should be replicated. E-mail messages that contain replication instructions and objects are created based on the information obtained from the comparison. The e-mail messages are then sent to the appropriate sites. A process known as multicasting can be used to send one replication message to all of the necessary sites. Alternatively, a separate message can be sent to each of the sites. An e-mail message that contains information regarding a site's current state (i.e., an ACK message) is sent to the sites that the replication agent has recently corresponded. The replication agent may also send an ACK message to a site from whom it has not heard for a period of time.

Electronic mail systems do not guarantee delivery of a message, or that messages will be received in the right order. In workgroup applications, one object may depend on another object (e.g., a reply object depends upon the object to which it is a reply). Before a dependent object can be incorporated into the forum database, any object upon which it depends must be available to be placed in the forum, or already be in the forum database. The replication agent uses a process referred to as reassembly to resolve dependencies. If the replication agent can resolve an object's dependencies, the object can be replicated into the site's forum database. If the object's dependencies cannot be resolved in the current replicator session, the object remains in the forum's mailbox until the next replicator session.

During the process of reassembly, an object is marked as "arrived" when it is first processed by the site's replication agent. If all of the object's dependencies can be resolved, the object graduates to the "dependencies satisfied" state. The only way an object can be considered to be in the "dependencies satisfied" state is if the object has "arrived" and all of the things upon which the object depends are in the "dependencies satisfied" state. If all of the objects in the mailbox are considered to be in the "dependencies satisfied" state, the reassembly process is complete. If some, but not all, of the objects have graduated to the "dependencies satisfied" state, the process is repeated to determine whether any of the objects that were marked as "dependencies satisfied" can resolve the dependencies associated with those objects that are still in the "arrived" state. Any objects that are still considered "arrived" after the reassembly process remain in the site's mailbox. An attempt is made to resolve the dependencies of any remaining object in a subsequent replicator session.

When multiple versions of the same object are received at a site during replication, the object's UIDs can be used to resolve conflicts. For example, a site may receive a message from a first site to replicate an object modification. The same site receives a second message to update the same object from another site. That is, the object has been modified concurrently by different users at two different sites. The replication agent can use the version information contained in the objects sent by the two remote sites to determine what modification is implemented. The algorithm guarantees that the outcome will be the same at all sites by making the decision a function of the version information and the UIDs.

The present invention implements techniques for controlling the flow of messages in the e-mail systems. An e-mail system has a finite capacity to store "in-transit" messages. To reduce the burden on the e-mail system, the replication agents practice a flow control discipline that limits the number of messages concurrently "in-transit" between any two agents, in conjunction with the ACK messages.

The present invention implements techniques for handling errors that may occur in e-mail transmissions. The present invention uses various techniques to minimize the effects that an error in transmission may cause. For example, replication agents must acknowledge to one another that every replication e-mail message sent was received without error. If an e-mail message is not acknowledged, it is automatically retransmitted. Further, the expected time to receive an acknowledgment is maintained for different sized messages for each site. Thus, the replication agent is constantly learning about the typical performance of the e-mail network with respect to specific distinctions. Therefore, the replication agent does not mistake normal variations in performance with an error condition. Further, it does not have to be manually tuned to maintain proper transmission behavior even when some sites receive their mail in minutes while others may not receive theirs for days, in the normal course of operation.

When a persistent error condition is detected, the replication agent temporarily halts retransmission of individual messages until it can confirm that reliable communications are re-established. The replication agent automatically terminates communications with the problem site. When the problem site comes back on-line, it begins communicating again, and the replication agents exchange replication messages until the forums are once again synchronized.

A replication agent automatically e-mails a message to notify an administrator whenever non-recoverable errors or problems requiring human intervention occur. The notification includes a complete log file. Automatic notifications ensure that administrators learn of replication problems that require their attention when they occur. However, administrators are not bothered by errors from which the replicators can automatically recover.

BRIEF DESCRIPTION OF THE DRAWINGS

FIGS. 8A–8B provide an illustration of a ProcessReceivedACK process flow.

FIGS. 9A–9B provide an example of a Targeting process flow.

DETAILED DESCRIPTION OF THE INVENTION

A method and apparatus for information sharing and replication via a store-and-forward messaging network is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
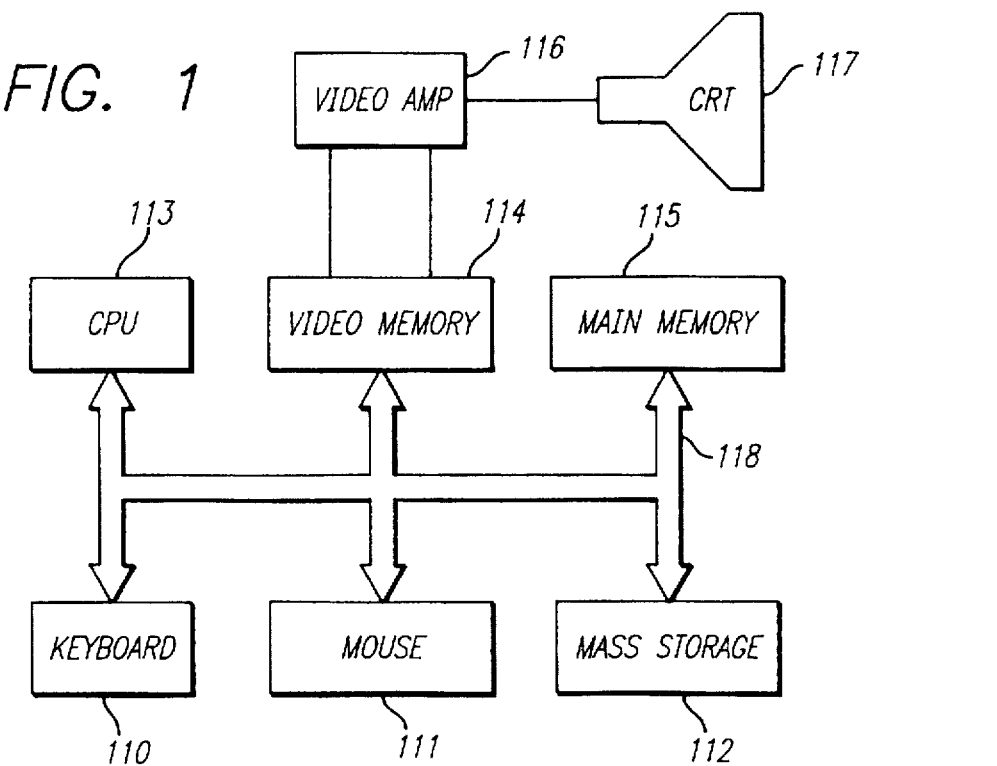
FIG. 1 provides an illustration of a general purpose computers for use with the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment. When a general purpose computer system such as the one described executes the processes and processes flows described herein, it becomes a special purpose computer that replicates information as described herein.

Figure 2A:
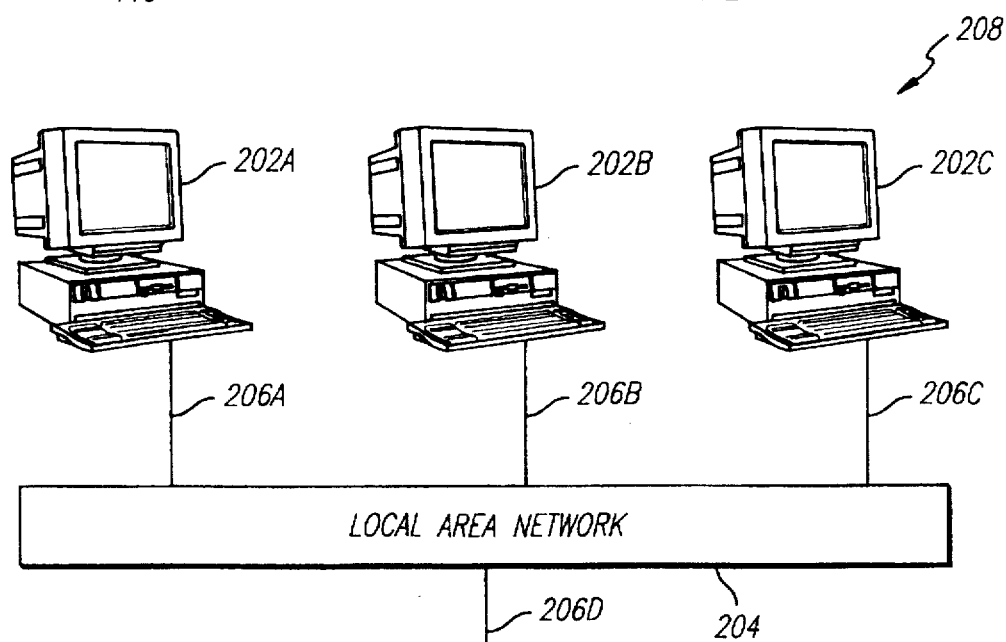
FIG. 2A provides an illustration of a workgroup application environment at a single site.

In a workgroup environment, a group of users share documents. A workgroup application manages the information used to maintain a collection of documents (i.e., forum) and to allow a group of users to share group information. Using a workgroup application, users can add information to and find information in the electronic discussion as well as respond to the contributions of others, for example. FIG. 2A provides an illustration of a workgroup application environment at a single site.

Workgroup environment 208 includes workstations 202A–202C. Workstations 202A–202C are connected to local area network (LAN) 204 via taps 206A–206C, respectively. Workstations 202A–202C are general purpose computers of the type previously described, for example. Workstations 202A–202C are, for example, "windows-based" workstation or a Macintosh. Workstations 202A–202C can execute a workgroup application that allows a user to participate in a forum. Such a workgroup application is, for example, Collabra Share Client by Collabra Software, Inc. of Mountain View, Calif. However, the present invention can be used with other workgroup applications software.

In the preferred embodiment, the present invention uses a DOS-file-compatible LAN operating system, such as NetWare or Windows for Workgroups. It runs on Windows 3.1 and uses an electronic mail messaging facility. Other operating system software can be used with the present invention.

Message Store 210 is connected to LAN 204 via tap 206D. Message store 210 contains a collections of files. Message store 210 is, for example, a server or a shared hard disk on LAN 204. Files can be stored, for example, on a DOS 3.1 compatible central file server or shared hard disk including Novell NetWare, Microsoft Windows NT Advanced Server, Microsoft LAN Manager, Banyan VINES, DEC PathWorks, or Microsoft Windows for Workgroups. Message store 210 includes forum files, forum membership information, and administration files, for example. Each forum file stored in Message Store 210 represents contributions to a forum. The files stored in Message Store 210 are accessible by members of the forum.

The environment depicted in FIG. 2A provides a workgroup whose membership extends to a local area network (e.g., LAN 204). Using the present invention, the workgroup can be extended to include other workgroups or members at a remote site (e.g., other parts of the organization or external to the organization). The present invention uses existing electronic mail systems to transmit replication information to a remote site.

Figure 2B:
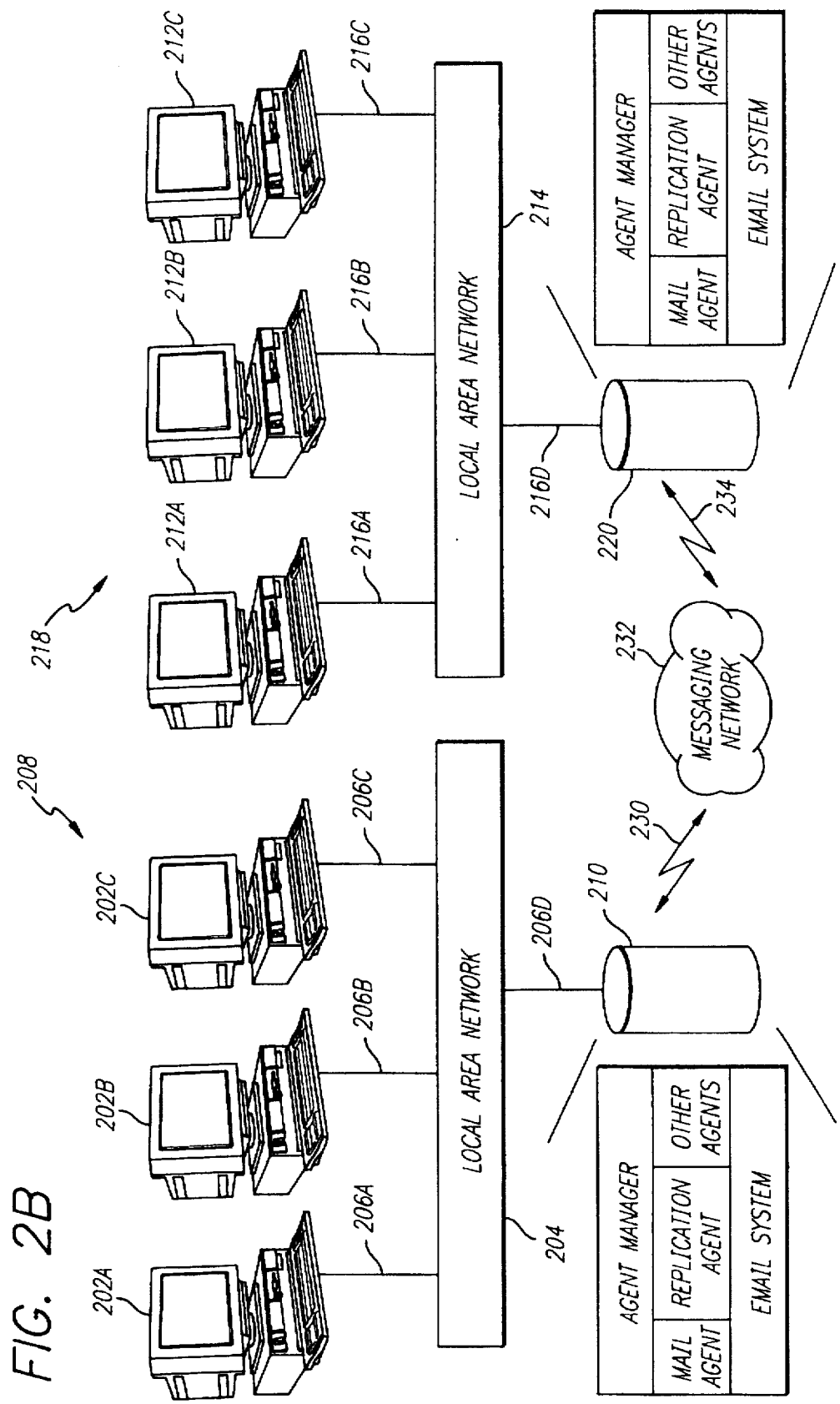
FIG. 2B provides an illustration of replication using an electronic mail system as provided by the present invention.

FIG. 2B provides an illustration of replication using an electronic mail system as provided by the present invention. Using the present invention, group information is replicated between sites. The present invention provides an automated connection between the workgroup application and electronic mailboxes. The automated connection uses electronic mail ("e-mail") messaging to maintain complete duplicates of forums at sites connected via e-mail.

Referring to FIG. 2B, workgroup environment 208 is as described above and depicted in FIG. 2A. Workgroup environment 208 comprises LAN 204 which serves to interconnect workstations 202A–202C and message store 212. In addition, FIG. 2B includes workgroup environment 218.

Workgroup environment 218 includes LAN 214 which interconnects workstations 212A–212C and message store 222.

Workstations 212A–212C are general purpose computers of the type previously described, for example. Workstations 212A–212C are, for example. "windows-based" workstation or a Macintosh, for example. Workstations 212A–212C can execute a workgroup application that allows a user to participate in a forum. As previously indicated, such workgroup application is available from Collabra Software, Inc. of Mountain View, Calif., for example. Other workgroup applications software can also be used.

Message Store 220 is connected to LAN 214 via tap 216D. Message store 220 is, for example, a server or a shared hard disk of the type described above. Message store 220 includes a replication of the forum files maintained in message store 210. As contributions are made to the forum in either workgroup environment 208 or 218, they are replicated at the other site.

For example, a user of workstation 212B is a member of the forum replicated from message store 210 to message store 220. Using the workgroup application software, the user views a forum document stored on message store 220 (replicated from message store 210). The user modifies the document in some manner. Using the replication capabilities of the present invention, the user's contribution is replicated from workgroup environment 218 to workgroup 208. Using the present invention, a remote user can participate in a local forum.

As illustrated in FIG. 2B, message stores 210 and 220 are interconnected via messaging network 232 and connections 230 and 234. Messaging network 232 is an existing system that executes independent of the present invention. The replication capabilities of the present invention use the functionality of messaging network 232 without any modifications to messaging network 232. Messaging network 232 can be, for example, Microsoft Mail, cc:Mail, Lotus Notes, Novell GroupWise, IBM PROFs, DEC ALL-IN-1, HP OpenMail, the Internet, and public mail services. The present invention can be used with mixed e-mail systems (e.g., MAPI and VIM LAN). In the preferred embodiment, the replication of the present invention occurs using an electronic mail system. Since the present invention does not require any modifications to the messaging network, virtually any store-and-forward messaging network can be used with the present invention.

As illustrated in FIG. 2B, message stores 210 and 220 include an agent manager, mail agent, and a replication agent. An agent provides the ability to automatically update information for a particular forum at specified time intervals. The time intervals are identified by system administrators. The agent manager associates a forum and an agent and manages the activity between the forum and agent. Using the agent manager, a system administrator can define how often to run an agent, setup schedules for tasks and define policies for log files.

The mail agent provides the ability to access information from a source outside the forum or workgroup. For example, the mail agent provides the ability to obtain "news feed" (e.g., Dow Jones). The mail agent can be set up to automatically obtain information from an external source and feed the information to a forum via electronic mail. The mail agent can connect a remote user that only has the ability to send and receive electronic mail (i.e., does not have workgroup application capabilities) to communicate with a forum. The remote user sends an e-mail message to the mail agent. The mail agent threads the message into the discussion database.

The mail agent and replication agent use a software library that provides the ability to talk to the electronic mail system. The software library provides a general interface to any mail system. It is an application program interface whose functionality is be invoked via function calls that conform to an ANSI standard specification (e.g., CMC) for talking to mail systems. The software library translates the format of a function call to the format of the underlying mail system. The software library is available from Collabra Software, Inc.

Software that implements the functions of the agent manager and mail agent as described are available from Collabra Software, Inc. in Mountain View, Calif. Other software products that implement similar capabilities can also be used with the present invention without departing from the scope of the present invention.

Like the mail agent and the agent manager, the replication agent is stored in the file server or shared hard disk. Separate replication agents monitor the forums at separate installations (e.g., workgroup environments 208 and 218 in FIG. 2B) and maintain these forums as copies of each other. The replication agent enables users to participate in forums across network and geographic boundaries by copying forums at multiple sites via e-mail systems. Replication is done without real-time connections between replicated forums. Using the existing infrastructure (e.g., e-mail system), changes that are made at one location are replicated to other sites.

To initiate replication, a replication agent is initialized and scheduled for each forum (original and replica) which is to be replicated. These replication agents act as server agents that talk to similar replication agents running at other sites. Agents contact each other via e-mail to download the contents of a forum and exchange periodic updates.

Figure 3A:
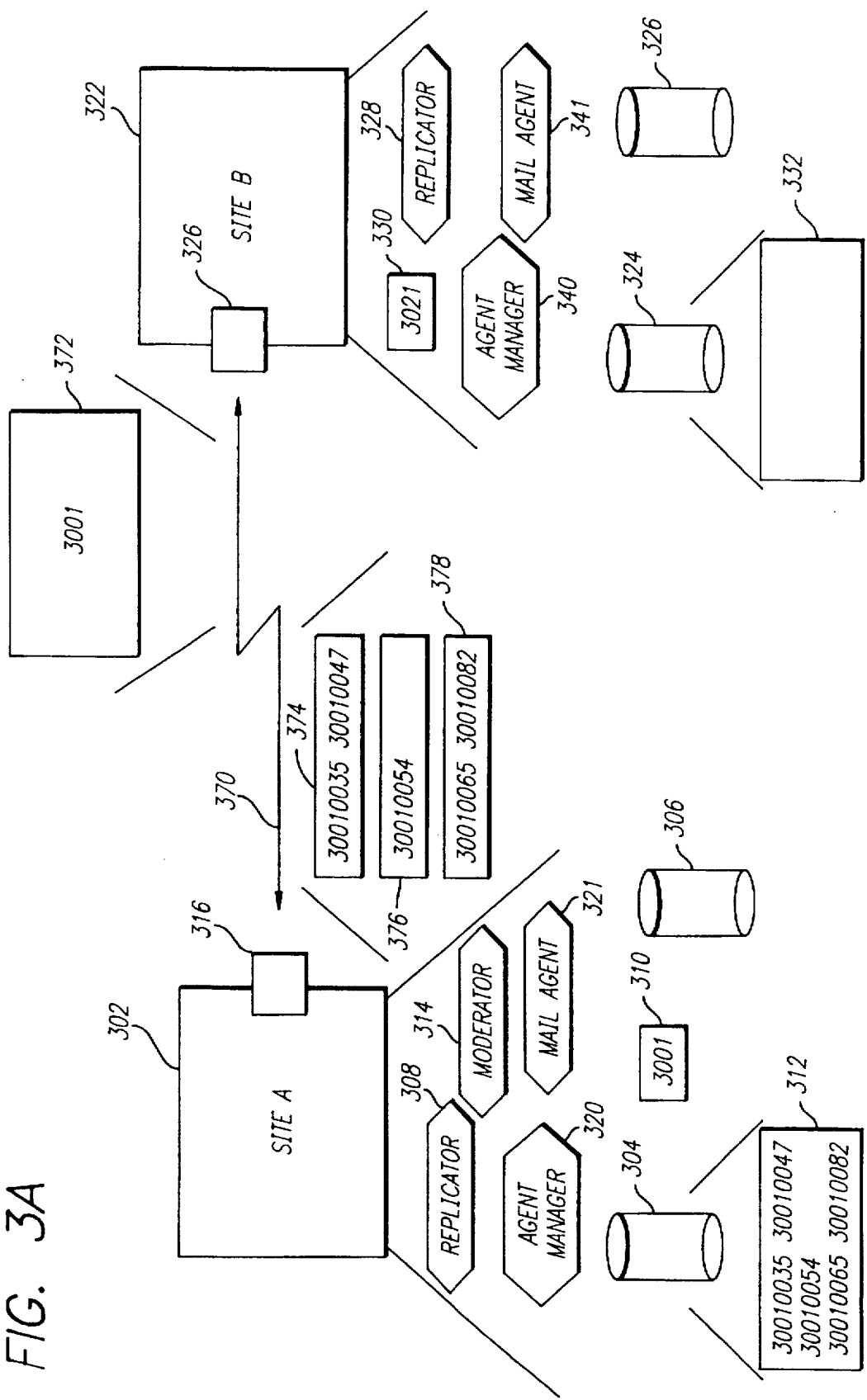
FIGS. 3A–3B illustrate a workgroup environment including an original forum and a replicated forum.

FIG. 3A illustrates a configuration in which a forum is replicated to another site. Site 302 is the original forum. Site 322 is a new replication site that is to be a replica of the original forum at site 302. Sites 302 and 322 include a replication agent for managing forum replication (replicators 308 and 328, respectively). Sites 302 and 322 also include agent managers 320 and 340, respectively. Agent managers 320 and 340 schedule sessions for the replicators 308 and 328 as discussed previously. Both sites also include mail agents 321 and 341, respectively.

The forum requires at least one moderator such as moderator 314. Moderator 314 has privileges to read, create, reply to and delete forum documents. Moderator privileges are given to at least one forum member. Moderator 314 can specify the access privileges of other forum members. Moderator 314 handles requests for membership to the forum. Moderator 314 reviews a request for forum enrollment, or membership, and explicitly grants or denies membership. Therefore, moderator 314 can enforce an enrollment policy.

A moderator's membership is recorded in the forum itself in the form of a special document. This document replicates like any other document. Thus, by virtue of replication, the moderator 314 at Site A also has moderator privileges at Site B, should he visit that site. The replication of membership mechanism applies to all forum users ("members") whether or not they are moderators.

Each site has a forum database (304 and 324 for sites 302 and 322, respectively), an electronic mailbox (314 and 336 for sites 302 and 322, respectively), and a side replicator database (306 and 326 for sites 302 and 322, respectively). Each site has a replicator (replicators 308 and 328 for sites 302 and 322, respectively) that manages the automated connection between the workgroup and the mailbox. Forum databases 304 and 324 contain each forum document. A document is a computer file in the forum that other members of the forum can see and to which they can reply. A document has a title, author and date. Forum databases 304 and 324 maintain a document's title, author, date information and the document's contents. Forum databases 304 and 324 also maintain full text indices of the documents to identify the location of every word in a document).

A document can be part of a thread. A thread is a collections of documents that descend from an original document in a forum. A thread includes the original document and any document that is a reply to the original or another reply. A parent document is the document that is next up from the current document in a thread hierarchy. In addition, documents can be grouped into categories of related documents. Forum databases 304 and 324 can further maintain a document's thread, parent and category information, for example.

Forum databases 304 and 324 maintain data related to the information that is manipulated by forum members. Side replicator databases 306 and 326 maintain information related to the replication of forum information. For example, side replicator databases 306 and 326 maintain a list of correspondents, or other sites maintaining copies of the forum. Side replicator databases 306 and 326 includes knowledge of the state of every known correspondent. For example, the correspondent entry in side replicator database 306 contains the site identifier 318 for site B (i.e., "3021"). Other information related to site B can also be maintained in side replicator database 306. For example, site A's Inbound Message Table and site B's Outbound Message Table are maintained in the side replicator database 306. Site A's Event Table is stored in side replicator database 306 as well. Similarly, Site B's side replicator database 326 maintains information related to site A such as site A's site identifier 334 (i.e., "3001"), for example.

Replication between sites 302 and 322 is performed using e-mail connection 370. Sites 302 and 322 have electronic mailboxes 316 and 326, respectively, for sending and receiving e-mail messages from a site's e-mail system. An e-mail system is used to send forum documents that are to be replicated to another site.

The e-mail system is further used to send replication control messages between sites. These control messages are used to communicate the current state of a site, for example. Such control messages are called "ACK" messages. An "ACK" message is sent from one site to the next to communicate the sending site's current state of replication. Referring to FIG. 3A, Site 322 sends "ACK" message 372 to site 302 to initiate replication of the forum at site 302.

Site 322 is, for example, a group of workstations interconnected via a LAN as illustrated in FIG. 2B. Site 322 can also be a single workstation having an electronic mail system, for example. Because site 322 is not a member of the forum initially, site 322 has an empty forum database 324 and side replicator database 326. The "ACK" message sent to site 302 to gain membership to the forum contains a forum identifier. A forum identifier is the same at all sites. In addition to the forum identifier, each site has a unique site identifier. A technique that can be used by a new site to obtain a forum identifier is discussed in a subsequent section.

Each object for replication has an original unique identifier ("UID") that is created at the time that the object is created. An object's original UID does not change when the object is modified. The original UID contains a site identifier that identifies the site at which the object was created. In addition to the original UID, an object has a self UID. An object may be modified or deleted by some event. An object's self UID is associated with the event that caused a change to the object. When an object is modified, the original UID remains unchanged and the self UID is modified. The new self UID is a unique identification. Either the original UID, the self UID, or both can be examined to determine whether the object has been modified.

For example, if an object has a self UID that is not equal to its original UID, an event has modified the object. Further, if a site has a self UID for an object that is different than another site's self UID for the same object, the sites contain different versions of the object. The "ACK" message sent by site B contains a list of UIDs for each object stored at site B. In the preferred embodiment of the present invention, the list is a compressed list of UIDs.

Referring to FIG. 3A, forum database 304 contains three entries. The first entry contains two UIDs, "30010035" and "30010047", for example. The first UID ("30010035") is an original UID for an object. The other UID ("30010047") is the object's self UID. In this example, the UIDs contain eight digits. The first four digits of the original UID identifies the site at which the object was created. The remaining four digits represent a unique number. The unique number is generated by incrementing a unique number counter by one each time a UID is assigned, for example. Other techniques such as a unique random number generator may also be used. The self UID indicates that the object has been modified by an event. The first four digits of the self UID identifies the site at which the event occurred to modify the object. The next four digits represent a unique number as previously described. By examining an object's original and current UIDs it is possible to determine the site at which the object was created and last modified. It should be noted that the format of the original and self UIDs provided here is for illustration purposes only. Other UID formats can be used without departing from the scope of the present invention. Another example of a UID format is provided below.

The next entry in site A's replicator database 304 is "30010054" (i.e., site plus unique number) which corresponds to a new object created at site A. This new object has not been modified. Therefore, there is no self UID for the object. The last entry in site A's replicator database 304 (i.e., "30010065 30010082") corresponds to an object that was created at site A (thus creating the original UID "30010065") and then deleted at site A (the delete event resulted in the "30010082" entry).

E-mail messages 374, 376, and 378 are generated at site A for transmittal to site B. Message 374 replicates the object represented by the first entry in forum database 304 (i.e., "30010035 30010047"). Message 374 contains the original UID and self UID for the object. Further, message 374 contains the object. Messages 374, 376, and 378 may also contain any instructions for replicating the corresponding objects at site B. Message 376 replicates the object represented by the second entry in forum database 304 ("30010054").

Message 378 corresponds to the object that was deleted at site A (i.e., the third entry in replicator database 312). Message 378 sends instructions to delete this object. Because site B is a new site, site B will ignore the instructions to delete the object since the object does not exist. However, site B add the objects' UIDs to its side replicator database 324. Message 378 would be sent to an existing site, however, to delete the object at that site. Messages 374, 376, 378 may also be sent to other sites with which site A maintains correspondence.

Figure 3B:
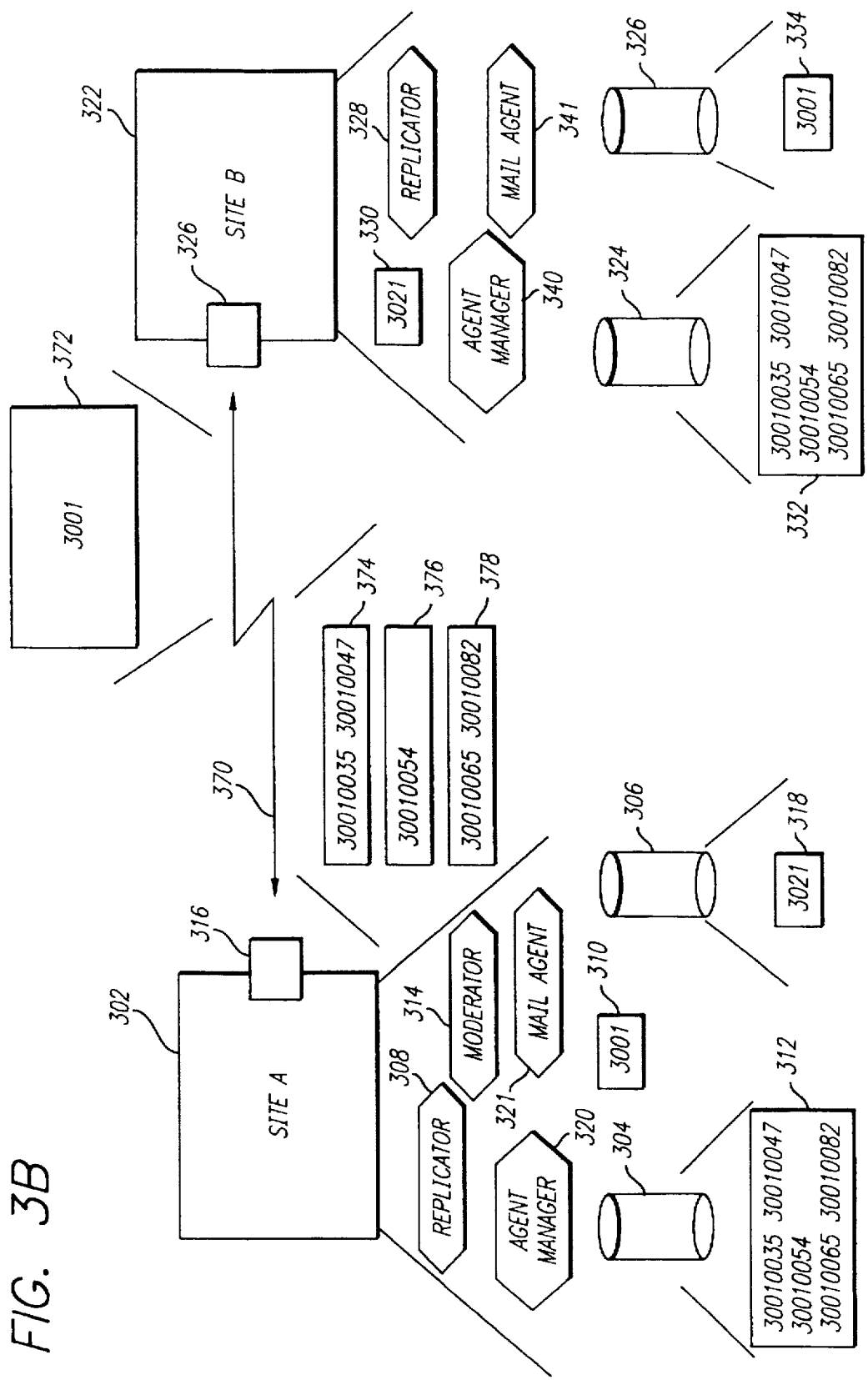

Site A's messages are received in Site B's mailbox for processing. Site B can process these messages to update the information at its site. FIG. 3B illustrates the contents of the forums at the original site (site 302 or site A) and the replicated site (site 322 or site B) after application of the messages received from site A. Side replicator database 306 contains an entry for site B in its list of correspondents. Side replicator 326 has a similar entry for site A. Side replicator databases 306 and 326 further contain the state of their correspondents (e.g., Site A is Site B's correspondent and vice versa). A correspondent's state is determined using an index of UIDs of the objects currently located at the correspondent. By processing the messages received from Site A, Site B's forum database 324 becomes an exact replica of forum database 312 as long as Site A's state does not change. Subsequent ACK messages can be sent by Site A to communicate a change in its state. Similarly, Site B can communicate changes in its state.

Data Flow and Storage Examples

Figure 10:
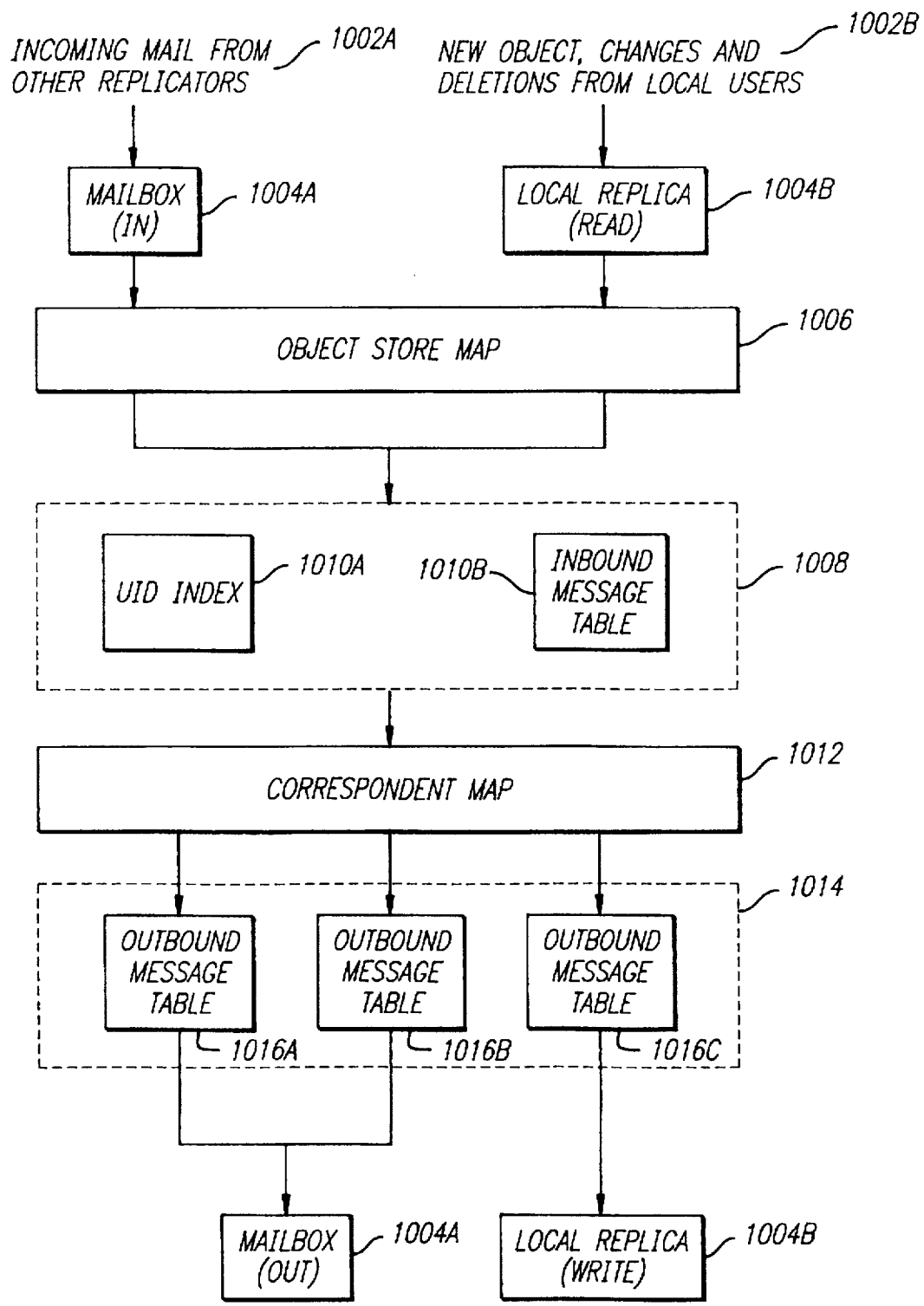
FIG. 10 provides an example of the information flow among some of the data stores used to maintain replication information.

FIG. 10 provides an example of the information flow among some of the data stores used to maintain replication information. Incoming mail 1002A is transmitted to the local site from other, remote sites by remote replicators. Incoming mail 1002A is received in the local sites mailbox 1004A (i.e., as incoming mail). An event 1002B (e.g., new object or a change or deletion of an existing object) occurs as a result of operations performed by local users. Event 1002B is maintained in the local replica or local replica 1004B. Object store map 1006 maintains a map of object stores at the local site. Two examples of object stores are mailbox 1004A and local replica 1004B. The object store map stores the location on the LAN of these object stores and other information needed to connect to them.

Information received from mailbox 1004A, local replica 1004B and object store map 1006 are used to update state information 1008 for the local site, known as the Event Table 1008. Event Table 1008 consists of UID Index 1010A and Inbound Message Table 1010B. UID Index 1010A contains a list of all of the objects known to the local site. Each object that is known to the local site has entries in UID Index 1010A that identify the object's original and self UIDs. In addition, these entries contain a pointer to each copy of the object stored at the local site. Further, UID Index 1010A provides versioning information such that the previous and subsequent versions of an object stored at the local site can be found. The Inbound Message Table 1010B maintains a subset of the information in the UID Index 1010A that the local replicator wishes to communicate to other sites. Each entry in UID Index 1010A and Inbound Message Table 1010B contains the state of the object (e.g., "arrived").

Correspondent map 1012 maintains information for locating remote site state information 1014. Remote site state information 1014 is stored in outbound message tables 1016A–1016C. Outbound message tables 1016A–1016C contain the same type of information as inbound message table 1010B. Outbound Message Tables 1016A–1016B contain copies of inbound message tables from another site. Outbound Message Tables 1016A–1016B are each associated with a remote replicator correspondent via mailbox 1004A. Outbound Message Table 1016C contains a copy of Inbound Message Table 1010B. Outbound Message Table 1016C is associated with local replica 1004B.

Each outbound message table maintains information regarding the state of a remote site with which the local site has corresponded. Each remote site maintains its own inbound message table similar to inbound message table 1010B. A remote site communicates its state by sending its inbound message table to another site via an ACK message. When a remote site sends an ACK message to the local site, the local site updates the outbound message table for the remote site. Using the local state information 1008 and remote state information 1014, the local site decides which objects and events it must send to each correspondent to provide each correspondent with any objects or events that the correspondent does not already possess. It then generates mail messages that are forwarded to mailbox 1004A as outgoing mail for delivery to the remote sites. The local site can further generate transactions for sending updates to its own local replica 1004B.

During Inbound Processing (described below), the replicator reads from mailbox 1004A and local replica 1004B. Further, in Inbound Processing, the replicator may write to local replica 1004B to perform stamping (i.e., permanent assignment of UIDs) as described below. During Outbound Processing (described below), the replicator may write to either mailbox 1004A or local replica 1004B. The replicator may re-read objects during Outbound Processing if it cannot buffer (in memory) all the objects it sees during Inbound Processing. Therefore, when the replicator decides to transmit an object to a correspondent during Outbound Processing, it re-reads the object from the object store where it found it during Inbound Processing.

The ACK message flow involves the same structures. However, the data flow occurs in the opposite direction. This is referred to as "the reverse channel" because the flow is in the opposite direction. An ACK message is sent to each correspondent from whom object(s) have been received this session (and sometimes for certain other reasons having to do with maintaining reliable communication). This happens once per session, immediately prior to transmitting any objects or events. The contents of the ACK message includes the contents of the inbound message table of the transmitting site along with some identification and control information.

Upon arrival, the ACK message replaces the outbound message table on file for the sender. Each replicator maintains as many outbound message tables as it has correspondents. A correspondent is either (a) another replicator (a complete instance of this diagram) with whom this replicator has communications, or (b) the local replica 1004B. The local replica 1004B is a correspondent because like a remote replicator, it needs to have new objects and events that it does not already possess transmitted to it. As the boxes and arrows at the very bottom of the diagram imply, there is little difference (to the replicator) between sending a mail message to a remote replicator correspondent and storing, updating or deleting an object in local replica 1004B. They are all acts of transmission (or replication).

UID Format

In a previous example, a UID includes a site identifier and a value generated using a counter. Other UID formats can be used for replication. In the preferred embodiment, for example, the UID is comprised of 4 fields. Each field is thirty-two (32) bits long.

One field contains a type code. The type code identifies the type of agency that invented the UID. For example, ordinary date base objects all have the same type. However, objects originating outside the replication system (e.g., from "news feeds" or foreign databases) can be identified using special types.

Another field included in the UID is the replication identifier (RID). A RID is a unique number identifying the specific replication agent that invented the UID. For example, each replica (data base site) has its own unique RID.

The UID further contains a sequence number (SEQ) field. The SEQ field identifies a particular object, or event (e.g. a change or delete). Each specific agent that invents UIDs assigns SEQs from a monotonically increasing integer address space.

A combination of the type code, RID, and SEQ fields provides a unique identifier across time and space. The fourth field, the checksum, is included in a UID, but is not required for uniqueness. Preferably, the checksum value is dependent on the type of object. Most objects carry a checksum that reflects their binary content (e.g. a CRC of their contents). A checksum is used to verify that the UID matches its target object. Further, it provides the ability to detect UID collisions (errors where the same UID is accidentally assigned to two different objects). Thus, it can act as a safeguard against the possibility that a UID is not unique.

Replicator Session

Figure 4:
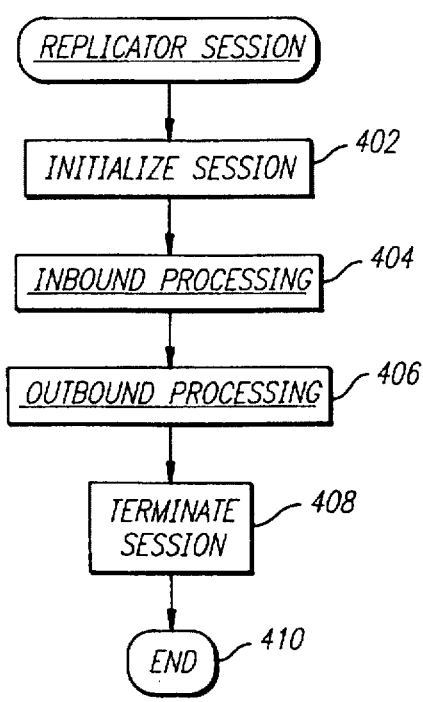
FIG. 4 provides an illustration of a process flow for a replicator session.

A replicator runs intermittently (i.e., dormant for a period of time) to manage replication. An agent manager is used to schedule a replicator's sessions. The agent manager activates the replicator session based on a specified schedule. The replicator becomes active and manages the automated connection between a workgroup and the mailbox. FIG. 4 provides an illustration of a process flow for a replication agent session.

At step 402, the replicator session is initialized. For example, the replicator session logs into the e-mail system and the DBMS. Further, log files are opened for write access.

The replicator then performs Inbound Processing at step 404. Inbound Processing processes new events (e.g., objects received via e-mail from another site and new or changed objects in a local database) and updates the side replicator database. The side replicator database constitutes the site's "world view" (i.e., the replicator's knowledge regarding its own site and other sites). The components of the side replicator database which are updated during Inbound processing are the UID Index and the Inbound Message Table, known collectively as the Event Table.

The replicator performs Outbound Processing at step 406. In Outbound Processing, the replicator processes the ACK messages received from other sites and updates its Outbound Message Tables. From these tables and its Event Table, the replicator determines what objects need to be sent to the other sites, imposes limits on the flow of messages, and transmits the messages to the other sites. Similarly, it determines which objects received from other sites need to be replicated at the local database. It performs the database transactions to replicate the objects that are to be applied to the local database.

The replicator session terminates at step 408. Termination of a replicator session includes logging off of the e-mail system and DBMS and closing log files, for example. Processing ends at step 410.

Inbound Processing

Figure 5:
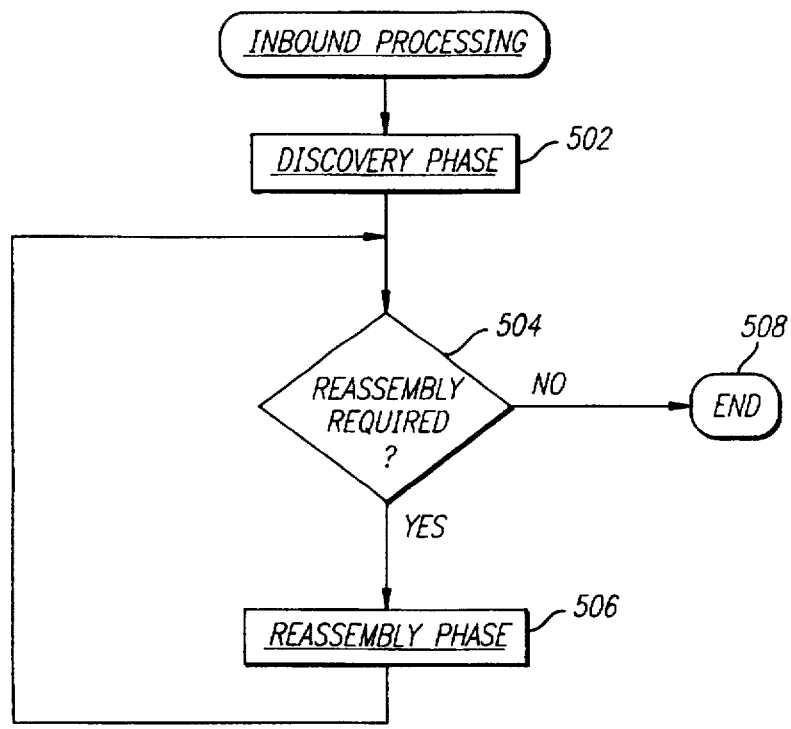
FIG. 5 provides an illustration of an InboundProcessing process flow.

Referring to FIG. 4, the replicator performs Inbound Processing at step 404. During Inbound Processing, the replicator updates the UID Index and Inbound Message Table using the events (database events and new e-mail arrivals) that have occurred since the last replicator session. FIG. 5 provides an illustration of a InboundProcessing process flow.

At step 502, the replicator performs the Discovery Phase. During the Discovery Phase, the replicator processes each event. For each event, the replicator performs any necessary updates to the site's UID Index and Inbound Message Table and attempts to resolve an object's dependencies. If all of the object's dependencies cannot be resolved, the object is added to a reassembly list. At step 504, the replicator determines whether reassembly is needed. Reassembly repeats the attempt to resolve an object's dependencies. Reassembly is required when there are objects in the reassembly list. If reassembly is not required, processing ends at step 508. If reassembly is required, processing continues at step 506 to perform the Reassembly Phase.

After the Reassembly Phase is performed, processing continues at step 504 to determine whether further reassembly is required. At this point, the replicator makes a determination whether further reassembly is needed by examining the results of the Reassembly Phase that was just performed. If there are one or more objects in the reassembly list and the dependencies for one or more objects were satisfied during the previous reassembly phase, the replicator repeats the Reassembly Phase in an attempt to resolve any outstanding dependencies. It is possible that an object whose dependencies were satisfied in the most recent execution of the Reassembly Phase may be able to satisfy the dependencies for an object in the reassembly list (i.e., an object with unresolved dependencies). In this case, processing continues at step 506 to repeat the Reassembly Phase. If, however, the replicator determines that there are no objects in the reassembly list or that there were no objects whose dependencies were satisfied in the previous execution of the Reassembly Phase, there is no need to repeat the Reassembly Phase during the current replicator session. Therefore, processing ends at step 508.

Outbound Processing

Figure 6A:
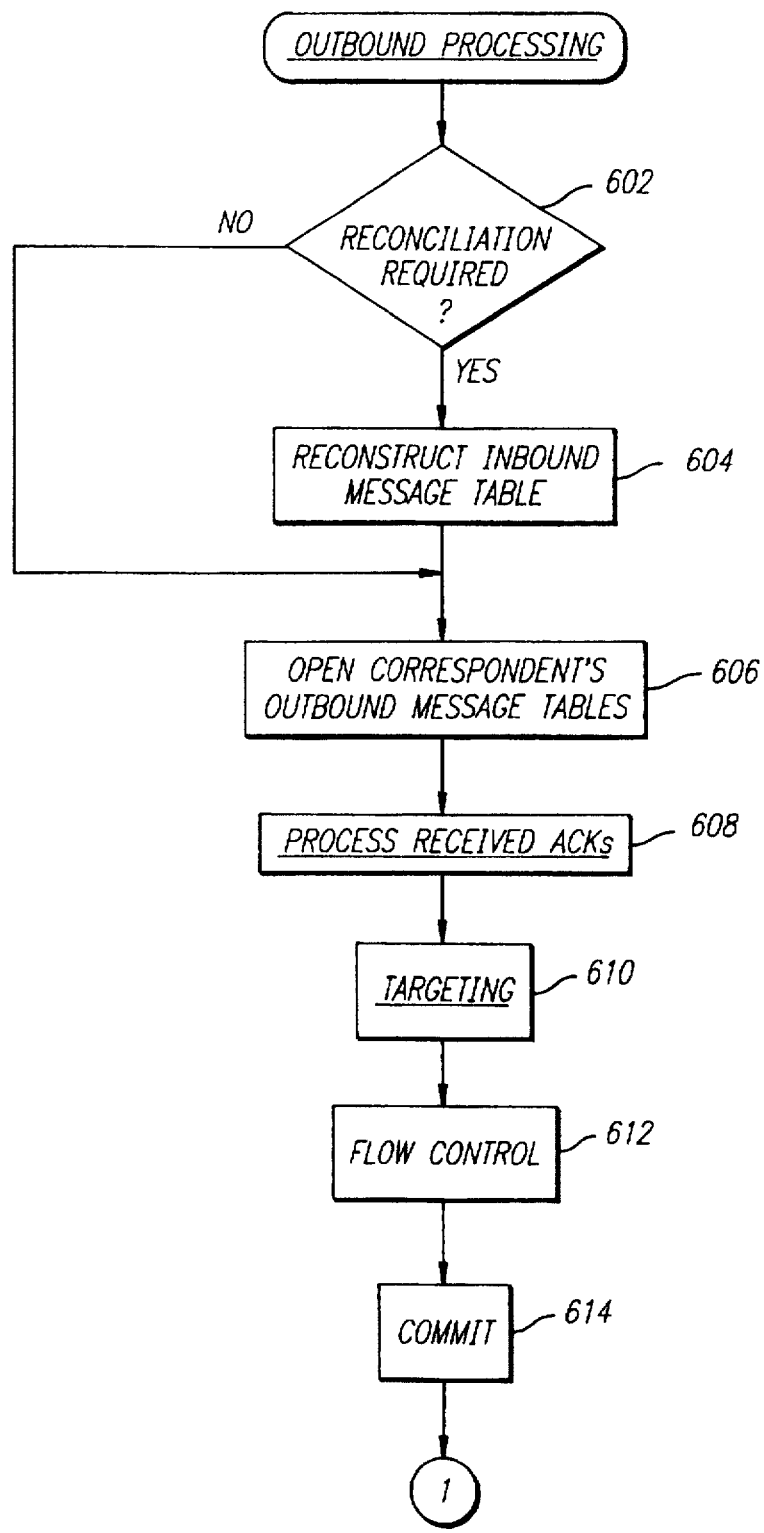
FIGS. 6A–6B provide an illustration of an OutboundProcessing process flow.
Figure 6B:
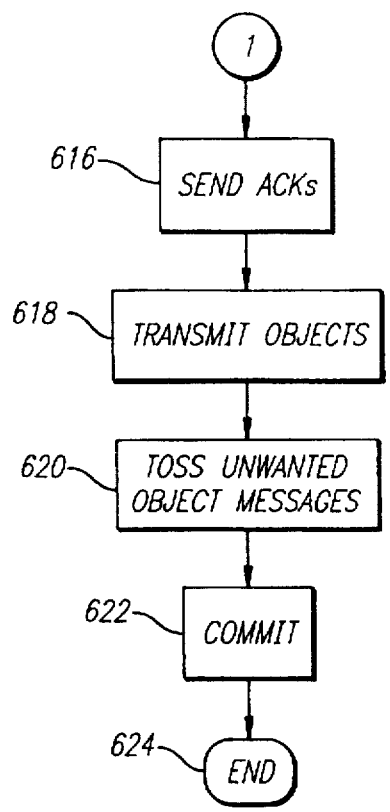

During the Outbound Processing portion of the replicator session, ACK messages that were received from the other sites are processed. The replicator updates the database, identifies the objects that must be sent to the other sites, generates transmittal messages, and transmits messages to the other sites. FIGS. 6A–6B provide an illustration of an Outbound Processing process flow.

At step 602, the replicator determines whether reconciliation is required. Reconciliation performs an exhaustive process of synchronization between the sites. The replicator maintains a UID Index that contains the UIDs for all objects as well as other information. The replicator further maintains an Inbound Message Table that contains a compressed list of these UIDs—that is, a subset of the information in the UID Index suitable for sending to the other sites. Normally, the Inbound Message Table is maintained in parallel with the UID Index during processing. However, during reconciliation, the replicator discards the Inbound Message Table and reconstructs it from the UID Index.

Reconciliation is performed to verify that the assumptions made by the replicators were valid and that the sites are in fact synchronized. During "non-reconciliation" processing, the replicator determines the UIDs that should be included in the Inbound Message Table based on a form of compression that is not loss-free (i.e., some information may be lost). The "non-reconciliation" Inbound Message Table is referred to as a compressed Inbound Message Table. An ACK message that is created using a compressed Inbound Message Table is referred to as a thin, or compressed, ACK message.

A compressed ACK message may indicate the status of a group of UIDs as a range of UIDs. For example, the status of UIDs 22001, 22002, 22003, and 22004 may be expressed as a range from 22001–22004. The replicator compresses UIDs for object and events which have been successfully received into such ranges, to keep the ACK message brief. This representation is not loss-free because it is ambiguous whether UID 22002, for example, ever existed anywhere. It merely conveys that all existing UIDs in the specified range have been successfully received.

Reconciliation is performed periodically (e.g., every two weeks). In addition, reconciliation may also be used as the initial communication with a new site or to communicate with a site whose database has been corrupted, for example. These are the conditions under which the ambiguities inherent in compressed ACKs can cause problems. Reconciliation can be used to eliminate the ambiguities.

A site reconciles with another site by sending a complete list of its UIDs to the other site. The UID Index contains a complete list of all UIDs known by the site to exist, including but not limited to the UIDs of all the site's objects. During reconciliation, a site reconstructs the Inbound Message Table using the UID Index. Thus, at step 604, the replicator reconstructs the Inbound Message Table from the UID Index. The reconstructed Inbound Message Table contains the UIDs for all of the site's objects. An ACK message that is created using the reconstructed Inbound Message Table is referred to as a fat, or uncompressed, ACK message. An uncompressed ACK message contains all of a site's object UIDs.

An uncompressed ACK message is used by the receiving site to verify that the receiving site has all of the objects that exist at the transmitting site. It is also used to verify that the sending site has all of the objects that exist at the receiving site. If not, another uncompressed ACK is sent in response.

Each remote site (i.e., each remote site's replicator) that communicates with the local site (i.e., the local site's replicator) is considered to be a correspondent of the local site's replicator. In addition, the local forum database is considered to be a correspondent of the local site's replicator. A correspondent is a location to which objects or events can be transmitted. In this context, the term "transmit" means to send as an e-mail message to a remote site or to insert the object or event directly into the local replica.

Each replicator maintains an Outbound Message Table for each correspondent. Each Outbound Message Table contains the information received in an ACK message from the associated correspondent. At step 606, the replicator opens each correspondent's Outbound Message Table. At step 608, the replicator performs the ProcessReceivedACKS to process the correspondents' ACK messages. At step 610, the replicator performs Targeting. During targeting, the replicator generates transactions that will move objects between the mailbox and the local replica, in both directions, as needed. These transactions will actually be performed later, during step 618 (Transmit Objects). Only objects and events which have been completely reassembled during Inbound Processing (that is, their dependencies have been satisfied) are eligible for targeting.

During targeting, the replicator examines its side replicator database (e.g., side replicator database 306 in FIGS. 3A–3B) in which is preserved the latest ACK message from each correspondent to determine what information must be replicated. Referring to FIG. 3A, Site A can determine from the absence of any UIDs in site B's "ACK" message 372 that it must replicate all of its forum information. At the same time that site A is assessing the state of site B, site A can perform the same operation on all of the other sites for which site A has a correspondent entry in its side replicator database 306 (including Site A).

At step 612, the replicator limits the flow for the messages that are to be sent to the other sites. It is possible for the e-mail systems to be flooded with messages from the original and replication sites. The present invention uses flow control to reduce the potential for overloading the e-mail system(s).

The flow control mechanism limits the number of messages in transit. That is, the number of e-mail messages that can be outstanding and unacknowledged en route to each correspondent is limited to a certain number.

At step 614, the replicator performs a first commit. Between replicator sessions, the UID Index, Inbound Message Table, and Outbound Message Table(s) are maintained on disk as files. During the first commit, the replicator writes new copies of these files which replace the previous files. This is done as an atomic ("all or nothing") operation using a file replacement method which is well known in the art. If any portion of the copy is unsuccessful, the previous versions of the files can be used to replace the new copies.

The Outbound Processing flow continues in FIG. 6B. At step 616, the replicator sends an ACK message (e.g., compressed or uncompressed) to its correspondents. The replicator replicates information (e.g., objects) at step 618. That is, the replicator sends e-mail messages to its correspondents that contain the objects for replication to the other sites. Further, the replicator updates the objects database at its own site using objects in the mailbox. Thus, the transmit step can perform "database-to-mailbox" or "mailbox-to-database" transmissions. In a "database-to-mailbox" transmission, the replicator sends objects contained in its forum database to the mailbox of another site via e-mail. A "mailbox-to-database" transmission can be used by the replicator to add a new object to the local database or update or delete an object in the local database by applying an object or event from the mailbox to the local database. Finally, a "mailbox-to-mailbox" transmission can be used by the replicator to send an object stored in the local mailbox to a remote site's mailbox via e-mail.

The replicator further determines, at step 618, the manner in which mail messages are addressed to its correspondents to optimize transmission. For example, an object that was created at the current site is to be sent to ten remote sites. One way of transmitting the message to the remote sites is to send separate a e-mail message to each of the ten sites. Alternatively, a technique referred to as multicasting can be used to send one e-mail message to all of the sites. Since the replicator is aware of all of the sites that require the message prior to sending the first transmission, a single e-mail message can be sent to all of the sites (i.e., to all ten sites). Thus, for example, a 100K e-mail message that is going to ten sites takes 100K of network bandwidth (over at least part of its route) rather than 1 megabyte. In the preferred embodiment of the present invention, the replicator uses multicasting to optimize transmission by sending one e-mail message to as many of the sites that have been identified by the replicator as needing the message as possible.

In some cases, it may not be possible to multicast the same e-mail message to all of the intended recipients. For example, the maximum message size options selected by the replicator may impact the degree of multicasting that can be used to transmit a message. In the previous example, it may be that optimal transmission to three of the ten sites entails breaking the messages into a series of multiple, smaller e-mail messages. Thus, for example, one e-mail message is split into three smaller messages. The remaining seven sites are able to receive the original, larger message. In this case, the replicator can multicast the larger message to the seven sites that are able to receive the message. The replicator can then multicast the three smaller messages to the three sites requiring the smaller messages.

At step 620, the replicator removes unwanted items from its mailbox. This step removes those messages from the site's mailbox that have been processed by the replicator and added to the local database. At step 622, the replicator performs a second commit. During the second commit, the replicator records the results of its attempts to transmits information to the correspondents. The replicator assigns states to an object. For example, the following states can be assigned to an object: "nonexistent", "expected", "arrived", "dependencies satisfied", and "superceded". An object that does not exist is considered to be in the "nonexistent" state. An object that has not yet been received but that is known to exist by the replicator is assigned to the "expected" state. When an object is received it is given the "arrived" state. When all of an object's dependencies are satisfied it is assigned to the "dependencies satisfied" state. Where an object has become obsolete by the receipt of a later version of the same object or by being deleted it enters the "superceded" state. All of these states are assigned by the replicator at the local site. The state of an object is maintained in the site's Inbound Message Table. State information is therefore transmitted to the other sites in addition to object UIDs, via the ACK message.

This state information is maintained at the receiving site in a corresponding Outbound Message Table. One additional state is maintained in the Outbound Message Table. A site's replicator may be aware of the fact that an object is "in transit". This state exists after transmission and until an ACK message is received indicating successful receipt of the transmission. In this case, the site's replicator marks the object as being "in transit" along with a date and time stamp that indicates when the transmission occurred. During the second commit at step 622, the transmitting site can update its information regarding the status of its attempts to transmit an object. The date and time stamp is used by the transmitting site to perform latency determinations to evaluate whether an error may have occurred in its attempt to transmit information to the receiving site. Further discussion regarding error handling is provided below.

At step 624, Outbound Processing ends.

Discovery Phase (in Inbound Processing)

Figure 7A:
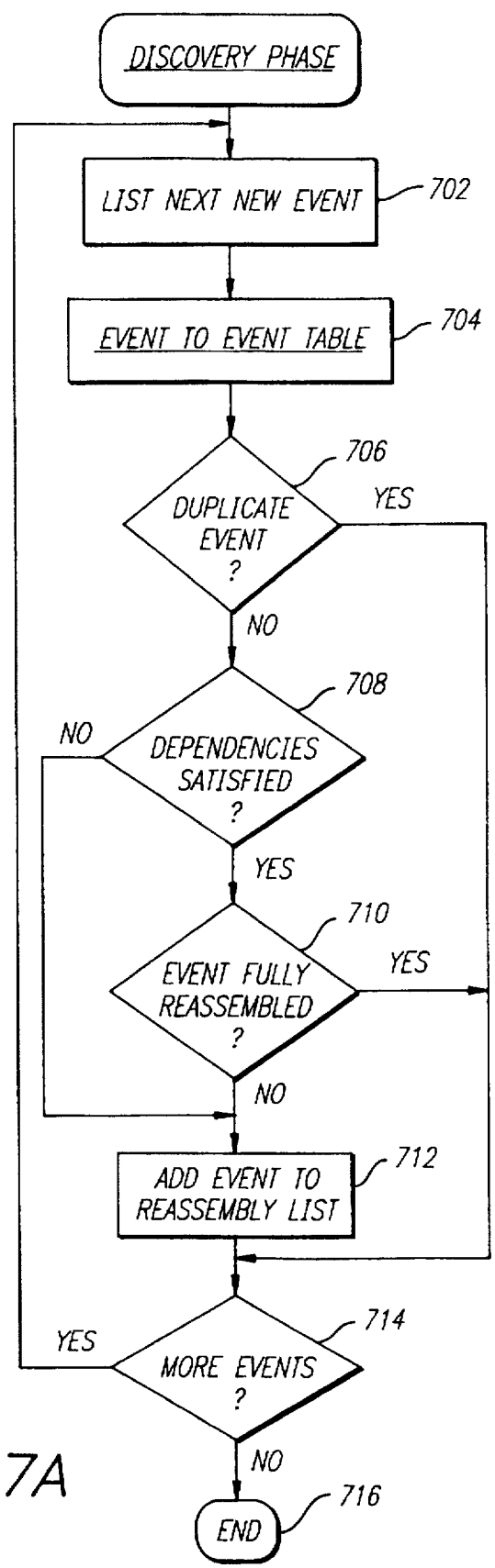
FIGS. 7A–7B provide an illustration of a DiscoveryPhase process flow.
Figure 7B:
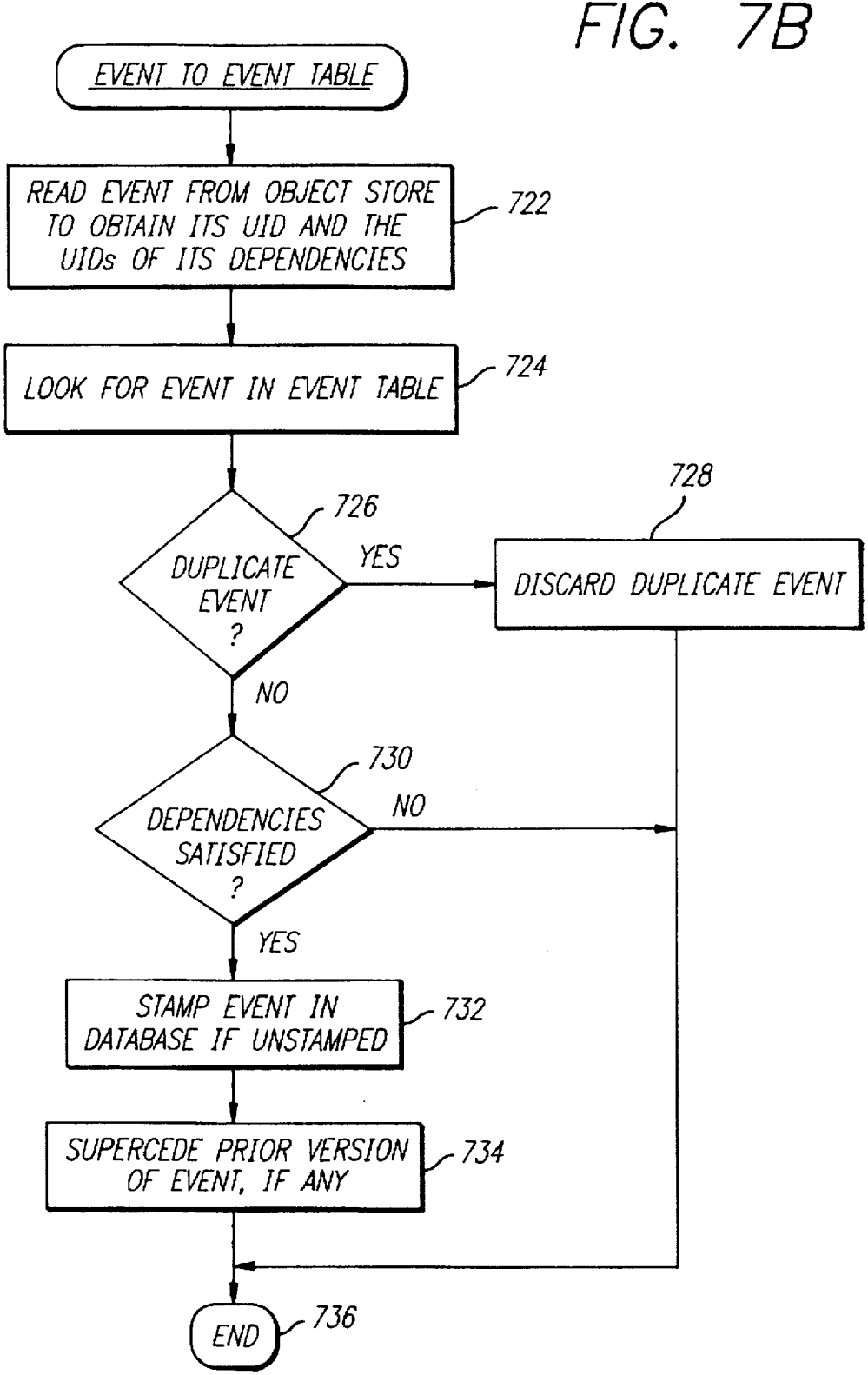

In the Discovery Phase, the replicator applies a new or changed object to the Event Table and reassembles the object. If the mailbox or database contains a new event, the replicator uses the new event information (e.g., the event may consist of a new object or instructions to delete an object) to update the site's Event Table. The Event Table is updated to include all objects known to the replicator. FIGS. 7A-7B provide an illustration of a Discovery Phase process flow.

At step 702 of FIG. 7A, the replicator gets the next new event (e.g., new, changed, or deleted object). A new event can be stored in an e-mail mailbox or a forum database. The replication agent, or replicator, first examines its mailbox to determine whether any messages have been received from another site that should be applied to its object stores. Messages 374, 376, and 378 from FIGS. 3A-3B are examples of such messages. Once the site's mailbox has been exhausted, the replicator searches the database for a new event.

At step 704, the replicator performs EventToEventTable processing. At step 706, the replicator determines whether the new event is a duplicate object (i.e., an object that already exists). If it is a duplicate object, processing continues at step 714 to determine if there are any more events. If the event is not a duplicate, processing continues at step 710.

At step 710, the replicator makes a determination whether the event is fully reassembled (i.e., all of its dependencies have been resolved). If the event is fully reassembled, processing continues at step 714 to determine whether there are any more events. If the event is not fully reassembled, processing continues at step 712 to add the event to the reassembly list. The reassembly list is used during the Reassembly Phase. During the Reassembly Phase, an attempt is made to resolve an object's dependencies.

At step 714, the replicator makes a determination whether there are any more events (i.e., in a mailbox or a database). If there are more events to be processed, processing continues at step 702 to obtain the next new event. If there are no more events to be processed, processing ends at step 716.

Reassembly Phase (in Inbound Processing)

Electronic mail systems do not guarantee delivery of a message, or that the message will be received in the right order. In workgroup applications, one object may depend on another object (e.g., a reply depends on the object to which it is a reply). Before a dependent object can be incorporated into the forum database, any object upon which it depends must be available to be placed in the forum, (e.g., an object in the "dependencies satisfied" state) or already be in the forum database. The replication agent uses a process referred to as reassembly to resolve dependencies. If the replication agent can resolve an object's dependencies, the object can be replicated in the site's forum database. If the object's dependencies cannot be resolved in the current replicator session, the object remains in the forum's mailbox until the next replicator session. In the Reassembly Phase, the replicator attempts to resolve the dependencies associated with an object. The Reassembly Phase may be repeated as many times as the replicator determines is appropriate to resolve object dependencies.

During the process of reassembly, an object is marked as "arrived" when it is first processed by the site's replicator. If all of the object's dependencies can be resolved, the object graduates to the "dependencies satisfied" standing. The only way an object can be considered to be "dependencies satisfied" is if the object was "arrived" and all of the things upon which the object depends are in the "dependencies satisfied" state. If all of the objects in the mailbox are considered to be in the "dependencies satisfied" state, the reassembly process is complete. If some, but not all, of the objects have graduated to the "dependencies satisfied" state, reassembly is repeated to determine whether any of the objects that were marked as "dependencies satisfied" can resolve the dependencies associated with those objects that are still in the "arrived" state. Any objects that are still considered "arrived" after reassembly remain in the site's mailbox (i.e., not applied to a database). An attempt may be made to resolve the dependencies of any remaining object in a subsequent Reassembly Phase or replicator session.

With three exceptions, the flow for the Reassembly Phase is the same as that used for the Discovery Phase. First, at step 702 of FIG. 7A in the Discovery Phase, the next new event is obtained from an object store (e.g., mailbox or database). In the Reassembly Phase, step 702 does not get the next event from the object store. Instead, at step 702 in the Reassembly Phase, the next object is obtained from the reassembly list. The second exception involves step 712 of FIG. 7A. During the Discovery Phase, step 712 adds an object to the reassembly list. In the Reassembly Phase, step 712 maintains, in the reassembly list, an object whose dependencies have not been satisfied. The third exception is described below in the EventToEventTable Process section. Otherwise, the process flow for the Reassembly Phase is the same as the process flow for the Discovery Phase.

EventToEventTable Process

The EventToEventTable process flow is executed during the Discovery and Reassembly Phases. The EventToEventTable process obtains an object's UID(s) and the UIDs of any dependencies. Further, the EventToEventTable process performs stamping. FIG. 7B provides an illustration of an EventToEventTable process.

At step 722, the object's UID(s) and the UIDs of any dependencies are read from the object store. At step 724, the Event Table is accessed to determine whether the object exists in the Event Table. Further, the UIDs of any dependencies are used to determine whether all of the objects upon which this object depends exist in the Event Table and are in the "dependencies satisfied" state.

At step 726, the replicator makes a determination as to whether the object is a duplicate object (i.e., it already exists at the site). If it is a duplicate object, it is discarded at step 728. Processing then returns to FIG. 7A at step 706. Because it is a duplicate object, processing would in effect continue at step 714 in FIG. 7A to determine whether any more events exist.

If the replicator determines, at step 726 of FIG. 7B, that the object is not a duplicate object, processing continues at step 730. If, at step 730, the replicator makes a determination that all of the object's dependencies have not been satisfied (i.e., all of the objects upon which this object depends do not exist in the Event Table), processing returns to step 706 in FIG. 7A. Since the object is not a duplicate and the object's dependencies have not been satisfied, in effect, processing continues at step 712 in FIG. 7A to add the object to the reassembly list (in the Reassembly Phase, the object remains on the reassembly list).

At step 730, the replicator examines an object's dependencies to determine whether they have been satisfied. An object's dependencies are represented as a list of UIDs stored with an object. A dependency is a reference to another object by its UID. These references make it possible to replicate not merely the objects themselves, but the structure of the database as a whole (i.e., the relationships among objects within the database).

The replicator recognizes two types of dependencies, known as hard dependencies and soft dependencies, respectively. The replicator treats these two types of dependencies differently for the purpose of determining whether an object can graduate to the "dependencies satisfied" state.

A hard dependency must be satisfied before the object can be incorporated into the database at a receiving site. An example of a hard dependency is the dependency of a reply upon the document to which it is a reply. If a hard dependency remains unsatisfied, the object as a whole must remain in the "arrived" state and cannot graduate to the "dependencies satisfied" state. The reply object cannot be added to the database and must remain in the mailbox. An object that is not added to the database is unavailable to users at the site. The object becomes available only after the object to which it is a reply arrives at the site and has its dependencies satisfied.

A soft dependency should be resolved, if possible. However, if a soft dependency cannot be satisfied in the current replicator session, the object that has the soft dependency can still be added to the database. An example of a soft dependency is a reference by one document to another, such as an embedded hypertext link created by the document's author. If the document to which the link refers is not yet available at the receiving site, the document containing the link reference can still be added to the database. The referenced document may arrive later (if it has not been deleted). Meanwhile, users that attempt to follow the hypertext link (e.g., by selecting it using a mouse) are told that the linked document is not yet available. This is referred to as a broken reference. If and when the referenced document arrives and is placed in the database, the broken reference can be repaired. Once repaired, a user can successfully follow the link.

An object that has been made eligible to be placed in the database with an unresolved soft dependency is considered to have satisfied that dependency, for the purposes of reassembly. Therefore the replicator may graduate an object with unresolved soft dependencies to the "dependencies satisfied" state. This is referred to as breaking a soft dependency. However, the replicator will not break soft dependencies during the Discovery Phase. It will only do so during the Reassembly Phase. (This is the third exception, mentioned above, to the statement that the process flow during the Reassembly Phase is the same as during the Discovery Phase.) Thus, any object containing one or more unresolved soft dependencies after processing during the Discovery Phase must go on the reassembly list and be reprocessed during the Reassembly Phase. By the end of the Discovery Phase, all new objects and events have been processed, so it is known that no more new objects will be encountered this session. The replicator avoids breaking soft dependencies until the Reassembly Phase so that objects will not have their soft dependencies broken simply because they are processed before the objects to which they refer. Therefore, provided they are processed in the same session, their soft dependencies will normally be resolved, regardless of the order in which they are processed.

The preferred method for storing a reference to other objects within an object is to store the UID within the object itself in the database. However, if the DBMS lacks the capability to store UIDs in the object itself, but implements some other method of linking objects together internally within the database, the replicator is nonetheless able to replicate these object relationships. For example, as previously mentioned, in a discussion database a document may be a reply to a previously created document. Such a reply document refers to the document to which it is a reply, known as its topic document. Such a reference is a hard dependency. If the DBMS has a means of enumerating the replies to a document and a means of accessing the topic documents to which a given document is a reply, but does not actually store the UID of the topic document within each reply document, the replicator is able to replicate the hard dependency.

When a reply document is encountered as a new event at the originating site during the Discovery Phase, the replicator uses the available DBMS facilities to locate the topic document. It then looks up the topic document in its UID Index via an inverted search. That is, it finds the UID of the topic document in the UID Index given the DBMS's internal identifier or pointer to the topic document. Having translated the DBMS's pointer to the topic document into a UID, it then attaches the topic document's UID to the reply object when it renders that object as an e-mail message. Thus, an object's dependencies are always represented by UIDs while an object is in transit between sites, even when the DBMS does not so represent them in the actual databases at each site. Upon arrival at another site, the receiving replicator translates this UID back into a DBMS internal identifier or pointer to the corresponding topic document in the receiving site's database, if the topic is present therein, by looking up the UID in the UID Index at the receiving site. The DBMS internal identifier for a particular object (e.g., the topic document) need not necessarily be the same at different sites, because the DBMS's may operate without any knowledge of each other and assign identifiers without attempting to make them universally unique across all sites. By translating these non-unique identifiers into UIDs at both the sending and receiving ends of the replication process, the replication agents ensure that the logical structure of the database is replicated including all references between objects within the database.

If the preferred method of storing a reference to other objects within an object is used (i.e., if the UID of the referenced object is stored by the DBMS within the actual document containing the reference), then such UIDs may also be used to represent links between the objects in different databases. This is the case because, as previously described, UIDs are unique not only within all replicas of a particular database but across all databases, due to the fact that each UID contains a RID component which identifies the originating database replica uniquely among all replicas of all databases. Thus, hypertext links from a document in one database to documents in other databases are possible if the preferred method of storage is used.

If the replicator determines, at step 730, that the object's dependencies are satisfied, processing continues at step 732 to stamp the object in the database if it has not been stamped. To stamp an object, a new UID is generated and assigned to the object. The new UID, (e.g., original or self UID) is written to the object's entry in the database. In the preferred mode, the database assigns a UID to the object when an entry is created by the DBMS using standard DBMS functions and/or commands. However, the replicator can perform this operation as illustrated by step 732.

As previously discussed, each distinct version of an object is assigned its own unique UID. When an object is updated, a new UID known as a current (or self) UID is assigned to the object. In addition, all versions of an object carry the UID of the original version of the object known as the original UID. At step 734, the UID of a previous version of an object is marked "superceded" in the Event Table. Superceded versions do not replicate. The replicator transmits only the latest version of each object.

The replicator performs the stamping process by examining a flag associated with each object set by the DBMS. Each object has a corresponding flag that indicates whether the object has been modified since the last replicator session. If the flag indicates that the object has been modified, a new self UID must be assigned to the object. If the object is not currently locked (e.g., the object may be locked because a user has exclusive access to the object), a new self UID is assigned to the object. If the object is locked, a new self UID is not assigned to the object during the current replicator session, and the object is ineligible for replication during the current session. At step 736, EventToEventTable processing ends.

ProcessReceivedACK (in Outbound Processing)

Once a site receives an "ACK" message, it processes the "ACK" message and responds to the sending site and any other site with which the receiving site has recently communicated. An "ACK" message contains the universal identifier of the forum and the site identifier of the site that sends the ACK message. Further, an ACK message contains a list of object UIDs and their states. A compressed ACK message contains only those UIDs that the sending site's replicator determines (based on its assumptions) must be communicated to a receiving site. An uncompressed ACK message contains UIDs for all of the objects known to the sending site for reconciliation and/or synchronization purposes. When a sending site is new or has recently reconnected, it does not have any object's or associated UIDs. Therefore, the sending site sends an uncompressed "ACK" message to the new site.

Referring to FIG. 3A, site B did not send any UIDs since it is a new site. A new site must first obtain the UID for the forum. Site B obtains forum information from a "ticket file". The "ticket file" is a file that contains the forum's identifier and recipient information such as a correspondent's mailbox. In the example, Site B is Site A's first correspondent.

Figure 8A:
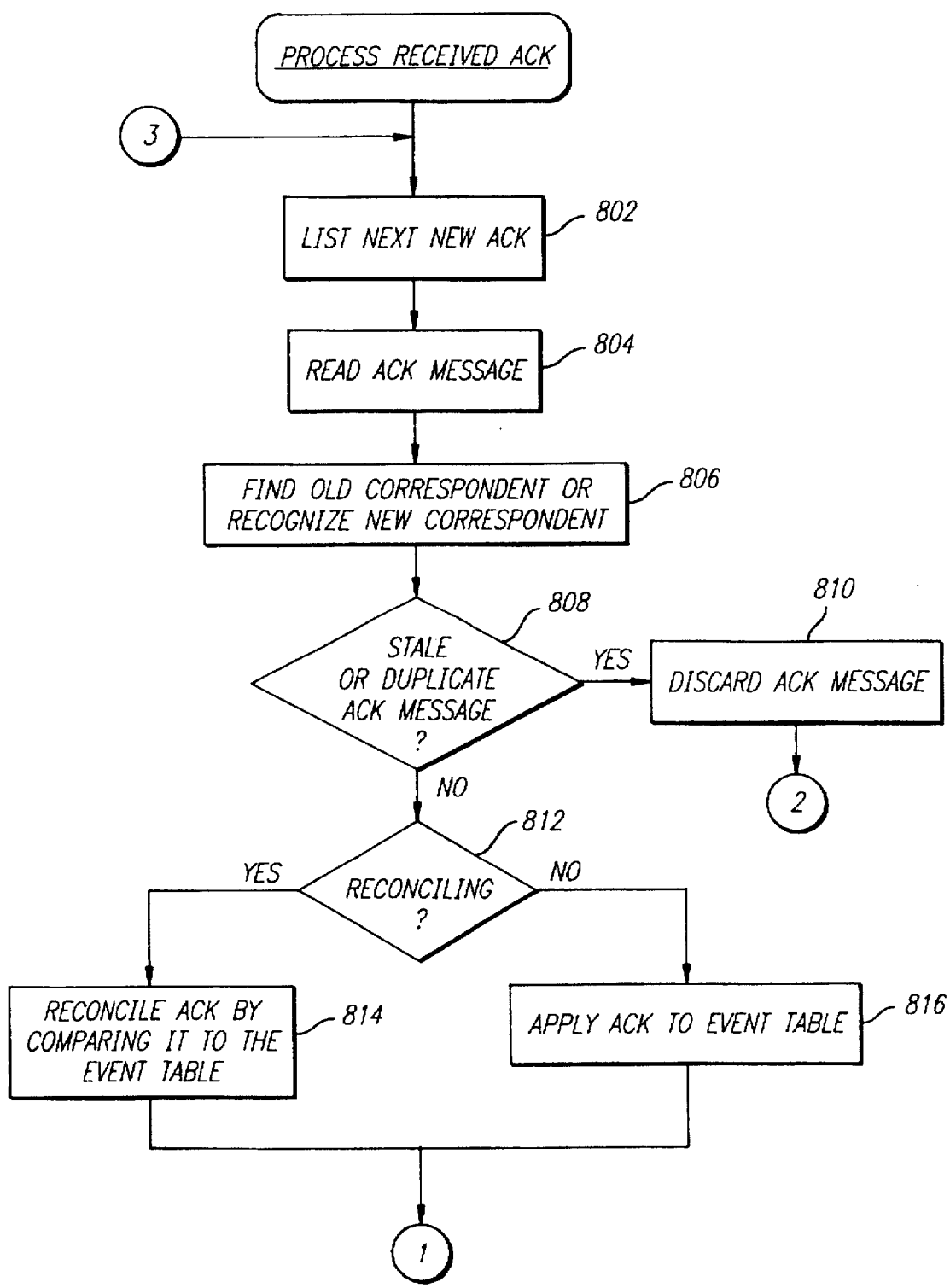

FIGS. 8A–8B provide an illustration of a ProcessReceivedACK process flow. At step 802, the replicator identifies the next ACK message (i.e., an ACK message received from one of the site's correspondents) to be processed. At step 804, the replicator reads the ACK message. The replicator uses the information contained in the ACK message to determine which correspondent sent the message at step 806. The sending site (correspondent) is either a correspondent from whom the site has previously corresponded, or a new correspondent.

At step 808, the replicator determines whether the ACK message is an old message or a duplicate of an ACK message that was previously processed. If it is a stale or duplicate ACK message, processing continues at step 810 to discard the ACK message. Processing continues at step 824 of FIG. 8B to determine whether any ACK messages remain to be processed.

If, at step 808, the replicator determines that the message is neither stale nor duplicative, processing continues at step 812. The replicator makes a determination as to whether to perform reconciliation using an uncompressed ACK message. Where reconciliation is to be performed, processing continues at step 814 to compare the UIDs in the ACK message with those contained in the Event Table. By doing so, a replicator makes a determination of the extent of its site's synchronization with the sending site. Processing continues at step 818 of FIG. 8B to apply the ACK message to the sending site's Outbound Message Table (i.e., the contents of the ACK message are compressed and then stored in the correspondent's Outbound Message Table).

If, at step 812, the replicator determines that the ACK message is not to be used for reconciliation, processing continues at step 816 to apply the UIDs in the ACK message to the receiving site's Event Table. Processing continues at step 818 of FIG. 8B to apply the ACK message to the sending site's Outbound Message Table as described above.

In step 818, the ACK message essentially replaces the previous copy of the Outbound Message Table for this correspondent. One exception is that any "in transit" entries in the Outbound Message Table must be preserved if they have no corresponding "arrived" entries in the ACK message. This is true because while an e-mail message is in transit, the site that sent the ACK message does not yet know that it is in transit.

Referring to FIG. 8B, the replicator determines whether the correspondent is a member of the forum at step 820. If the sending site is not a member of the forum, processing continues at step 822 to generate a join request.

If the forum has an open enrollment policy (i.e., any request to join the forum is granted), membership is automatically generated for the correspondent. If the forum does not have an open enrollment policy, a join request is generated to request the forum's moderator to either grant or deny membership to the new site. The moderator can review the join request and either grant or deny membership. The moderator sends a return message indicating whether membership is granted or denied. Replicators will not send objects to another site until membership is granted.

Once the replicator generates the join request, processing continues at step 824 to determine whether there are any more ACK messages to be processed. If, at step 820, the replicator makes a determination that the correspondent is a member of the forum, processing continues at step 824. At step 824, the replicator determines whether there are any ACK messages that have not been processed. If there are any remaining ACK messages processing continues at step 802 of FIG. 8A to get the next new ACK message. If there are no more ACK messages, processing ends at step 826.

Targeting (in Outbound Processing)

Figure 9A:
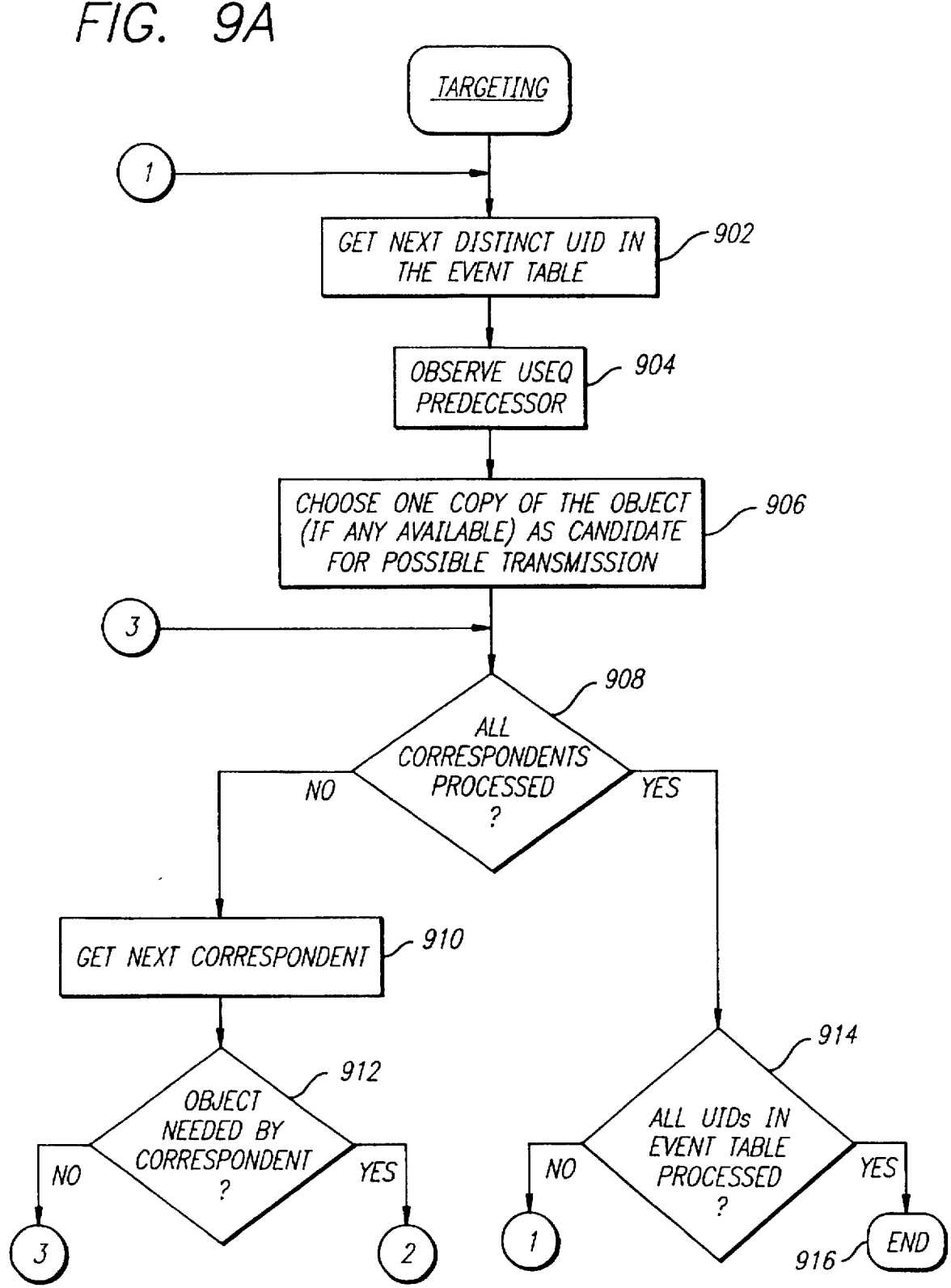

During Outbound Processing (e.g., FIGS. 6A–6B), the replicator determines the objects that should be sent to its correspondents or its local database(s). During Targeting, the replicator compares its Event Table to each correspondent's Outbound Message Table to determine those operations that must be performed to synchronize the sites. FIGS. 9A–9B provide an example of a Targeting process flow.

When an object is created, it is assigned a UID that includes an internal sequencing, monotonically derived value. For example, each new UID is one greater than the UID created just prior to the current UID. The replicator processes UIDs in this numerical order during Targeting. At step 902, the next UID (in numerical order by UID) is obtained from the Event Table. When an object is transmitted, it includes the UID of the next lowest object, numerically, that is known to exist. This value is known as a UID Sequence (USEQ) value. Thus, each object is linked to its predecessor object by a USEQ value. For example, the UID for a first object is "2345". The next object that is created is assigned "2346" as a UID. A third object has a UID of "2347". The USEQ identifier for the second and third objects is 2345 and 2346, respectively. Should the second object be deleted or superceded by a new version, the third object's USEQ value is updated to be "2345".

An object's USEQ value can be used by the replicator to determine whether the object's predecessor (i.e., the object with the next lowest UID) exists at the site. Thus, a USEQ value can be used by the replicator to identify those objects that it has not yet received, or that may have been lost in the transmission, for example. When the replicator identifies a predecessor object that it does not have, it can create an entry in the site's Event Table. The replicator specifies the state of the object as "expected". The replicator can further use the USEQ to determine objects that it needs to acquire from another site. At step 904, the replicator examines the Event Table to determine the object's USEQ Predecessor (the next lowest UID numerically of an existing non-superceded object) because this UID will be needed if the object is targeted for replication.

At step 906, the replicator chooses a copy of the object for transmittal, in case it becomes necessary to send the object to other sites. At step 908, the replicator determines whether all of the correspondents have been processed with regards to the current UID. If the replicator determines that all of the correspondents have been processed, processing continues at step 914. At step 914, the replicator determines whether there are any remaining UIDs to be processed from the Event Table. If there are no remaining UIDs to be processed, processing ends at step 916. If the replicator determines that UIDs remain to be processed, processing continues at step 902 to get the next UID from the Event Table.

If, at step 908, the replicator determines that a correspondent remains to be processed, processing continues at step 910 to get the next correspondent. At step 910, the replicator accesses the correspondent's Outbound Message Table to identify the objects that exist at the correspondent's site. At step 912, the replicator uses the correspondent's Outbound Message Table to determine whether the correspondent needs the object associated with the UID currently being processed. If the correspondent does not need the UID currently being processed, processing continues at step 908 to determine whether any correspondents remain to be processed with the current UID.

If, at step 912, the replicator determines that the current correspondent needs the object associated with the UID currently being processed, processing continues at step 922 in FIG. 9B. At step 922, the replicator composes a transaction to transmit the object to the correspondent. The transaction is not performed immediately. Instead, the transaction is inserted into a transaction list at step 924. By inserting the transaction in a transaction list, the transaction can be performed later, and the transaction can be placed in an order of execution along with all of the other transactions generated by the replicator's during its session. At step 926, the replicator performs latency calculations do determine the expected transmission time for this correspondent. At step 928, the replicator modifies the state of the object in the Outbound Message Table, if necessary. For example, if a transaction has been generated to transmit the object, its state is changed to "in transit". Processing continues at step 908 of FIG. 9A to determine whether any correspondents remain to be processed with the UID that is currently being processed by the replicator.

Error Handling

The present invention uses various techniques to minimize the effects that an error in transmission may cause. For example, replication agents must acknowledge to one another that every replication e-mail object or event sent was received without error. If a UID is not acknowledged as "arrived", it is automatically retransmitted. Thus, minor e-mail problems are automatically resolved without any intervention by a system administrator.

Further, the expected time to receive an acknowledgment is constantly being updated using, for example, an exponential decay heuristic. These expected times are maintained for different sized messages for each correspondent. Thus, the replication agent is constantly learning about the typical performance of the e-mail network. Therefore, the replication agent does not mistake normal variations in performance with an error condition.

When a persistent error condition is detected, the replication agent temporarily halts retransmission of individual messages until it can confirm that reliable communications are re-established. Thus, if an e-mail connection goes down for a period of hours or days, the replication agent can adjust its behavior automatically without the need for manual intervention by a system administrator. The replication agent is therefore resilient to occasional interruptions in e-mail service.

If the persistent error condition continues for a certain length of time, the replication agent automatically terminates communications with the problem site. When the problem site comes back on-line, its replication agent pro-actively sends a message that causes communication to be resumed. This message is a normal, uncompressed ACK message. That is, once communications can be resumed, the replicators take steps to synchronize the states of each site with their own. As described above, the replication agent maintains thee state of every replica with which it corresponds. During each replicator session, the replicator compares a complete index of its document store(s) with the UID Index for each of correspondents. If any discrepancies are discovered, a replication agent sends replication messages to resynchronize the sites. The replication agents exchange replication messages until the forums are once again synchronized.

In addition to the above, a replication agent automatically e-mails a message to notify an administrator that an e-mail error has occurred. The notification includes a complete log file explaining any unusual events. Automatic notifications ensure that administrators learn of replication problems when they occur. Further, a system administrator does not have to perform routine checks of the system to determine that there are no problems.

Thus, a method and apparatus for information sharing and replication via a store-and-forward messaging network has been provided.

We claim:

1. A method of replicating information between a first and second site using a messaging system comprising the steps of:

maintaining, at said first site, an index of objects currently known to said first site;

maintaining at said first site a message table for communicating to a second site the state of said first site, said first site's message table identifying a plurality of objects contained in said first site's index;

transmitting said first site's message table to said second site;

transmitting to said second site using said messaging system a plurality of messages, each of said plurality of messages containing object information; and updating said second site's state using said first site's message table and said plurality of messages.

2. The method of claim 1 wherein said step of maintaining said first site's index further comprises the steps of:

maintaining at said first site an object store, said object store containing information for replication;

reading information from said first site's object store;

updating said first site's index to include information obtained from said first site's object store;

updating said first site's message table from said first site's object store and said first site's index.

3. The method of claim 2 wherein said object store is a message store.

4. The method of claim 3 wherein said message store is an e-mail box.

5. The method of claim 2 wherein said object store is a database.

6. The method of claim 1 wherein said first site's index includes an original unique identifier (UID) and a self UID for each object in said first's site's index, said original UID is generated as said each object is created, said self UID is generated as said each object is changed.

7. The method of claim 1 wherein said step of maintaining said first site's message table further comprises the step of copying information associated with all of the objects contained in said first site's index.

8. The method of claim 1 wherein said step of maintaining said first site's message table further comprises the steps of:

reading an object from said first site's message table;

determining whether it is necessary for said first site to notify said second site about said object;

including uncompressed information for said object in said first site's message table if it is determined that said second site is to be notified about said object;

including compressed information for said object in said first site's message table if it is determined that said second site is not to be notified about said object;

determining whether said object should be sent to said second site;

compose a transaction to transmit said object to said second site if said object should be sent to said second site.

9. The method of claim 8 wherein said step of determining whether to notify said second site further comprises the steps of:

determining whether said second site has already been notified regarding said object;

determining whether said object exists.

10. The method of claim 8 wherein said determination steps use a message table transmitted from said second site to determine whether said second site should be notified about said object and whether said object should be sent to said second site.

11. The method of claim 8 wherein said uncompressed information comprises an original UID for said object, a self UID for said object if said self UID is different than said original UID and a state code for each UID.

12. The method of claim 8 wherein said compressed information comprises an original UID for said object, a self UID for said object if said self UID is different than said original UID and a state code for each UID.

13. The method of claim 12 wherein said compressed information is included as a range with another object's compressed information.

14. The method of claim 1 wherein one or more of said plurality of messages includes a copy of object to be replicated at said second site.

15. The method of claim 1 further comprising the step of maintaining at said second site a copy of said first site's message table.

16. The method of claim 1 wherein said update step further comprising the steps of:

comparing said first site's message table with an index for said second site, said second site's index is an index of objects currently known to said second site;

updating said second site's index to include object information for those objects identified in said first site's message table exists at said second site.

17. A method of transmitting an object from a first site to a second site via a messaging system comprising the steps of:

maintaining, at said first site, transmission characteristics for said second site;

transmitting said object from said first site to said second site;

receiving, at said second site, said object;

determining, at said second site, whether said object is dependent on another object;

determining, at said second site, whether said another object upon which said object depends exists at said second site and that its dependencies have been satisfied when said object is dependent on said another object;

permitting access to said object at said second site when said another object exists at said second site and its dependencies have been satisfied;

denying access to said object at said second site when said another object does not exist;

denying access to said object at said second site when said another object's dependencies have not been satisfied.

18. The method of claim 17 further comprising the steps of:

determining whether said second site needs a copy of said object;

determining whether a third site needs a copy of said object;

creating one message addressed to said second and third sites if said second and third sites need a copy of said object.

19. The method of claim 17 wherein said transmission step further comprising the steps of:

determining a message length for any message to be sent to said second site;

composing a single message when said message does not exceed the message length for said second site;

composing two or more messages when said message does exceed the message length for said second site;

recomposing, at said second site, said two or more messages into a single object independent of the order in which said two or more messages are received at said second site.

20. The method of claim 17 further comprising the step of:

transmitting by said second site a message acknowledging receipt of said object when said object is received by said second site.

21. The method of claim 20 further comprising the steps of:

monitoring by said first site said messages sent by said second site;

determining, using said second site's transmission characteristics, whether an acknowledgment message should have been received from said second site;

transmitting said object when said acknowledgment message was not received within the time indicated by said transmission characteristics.

22. The method of claim 17 further comprising the steps of:

transmitting to said second site an identifier that identifies a predecessor object, said predecessor object being the immediate predecessor to said object based on a numerical sequence known to both sites;

determining, at said second site, whether said predecessor object exists at said second site;

requesting said predecessor object from said first site when said predecessor object does not exist at said second site.

* * * * *